(12) United States Patent
Ikeda

(10) Patent No.: US 12,015,752 B2
(45) Date of Patent: Jun. 18, 2024

(54) IMAGE PROCESSING APPARATUS, METHOD OF CONTROLLING IMAGE PROCESSING APPARATUS, AND STORAGE MEDIUM FOR CONTROLLING FORWARDING OF DATA

(71) Applicant: CANON KABUSHIKI KAISHA, Tokyo (JP)

(72) Inventor: Toru Ikeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/188,381

(22) Filed: Mar. 22, 2023

(65) Prior Publication Data

US 2023/0319212 A1    Oct. 5, 2023

(30) Foreign Application Priority Data

Mar. 29, 2022    (JP) .................................. 2022-053570

(51) Int. Cl.
*H04N 1/32*    (2006.01)
*H04N 1/00*    (2006.01)

(52) U.S. Cl.
CPC ....... *H04N 1/3208* (2013.01); *H04N 1/00954* (2013.01); *H04N 1/3239* (2013.01)

(58) Field of Classification Search
None
See application file for complete search history.

(56) References Cited

U.S. PATENT DOCUMENTS

| 2006/0170963 | A1* | 8/2006 | Aoki | H04L 51/214 358/1.15 |
| 2018/0183950 | A1* | 6/2018 | Nagasawa | H04N 1/00344 |
| 2020/0249853 | A1* | 8/2020 | Dintenfass | G06F 13/1668 |
| 2021/0120144 | A1* | 4/2021 | Takahashi | H04N 1/32128 |

FOREIGN PATENT DOCUMENTS

JP    2021064919 A    4/2021

* cited by examiner

*Primary Examiner* — Lennin R Rodriguezgonzalez
(74) *Attorney, Agent, or Firm* — Canon U.S.A., Inc. IP Division

(57) ABSTRACT

According to an aspect of the present disclosure, if an image forming apparatus receives a FAX data, the image forming apparatus posts a message to a chat service indicating that the FAX data has been received, and according to a setting of a forwarding destination of FAX data and scheduled forwarding time, the image forming apparatus posts a message indicating the scheduled forwarding time of the received FAX data. If the image forming apparatus receives an instruction related to forwarding the received FAX data (canceling, changing scheduled time, changing forwarding destination) via the chat service, the image forming apparatus performs processing related to the forwarding the received FAX data (canceling to forward processing, changing scheduled time processing, changing forwarding destination processing) based on the instruction.

14 Claims, 20 Drawing Sheets

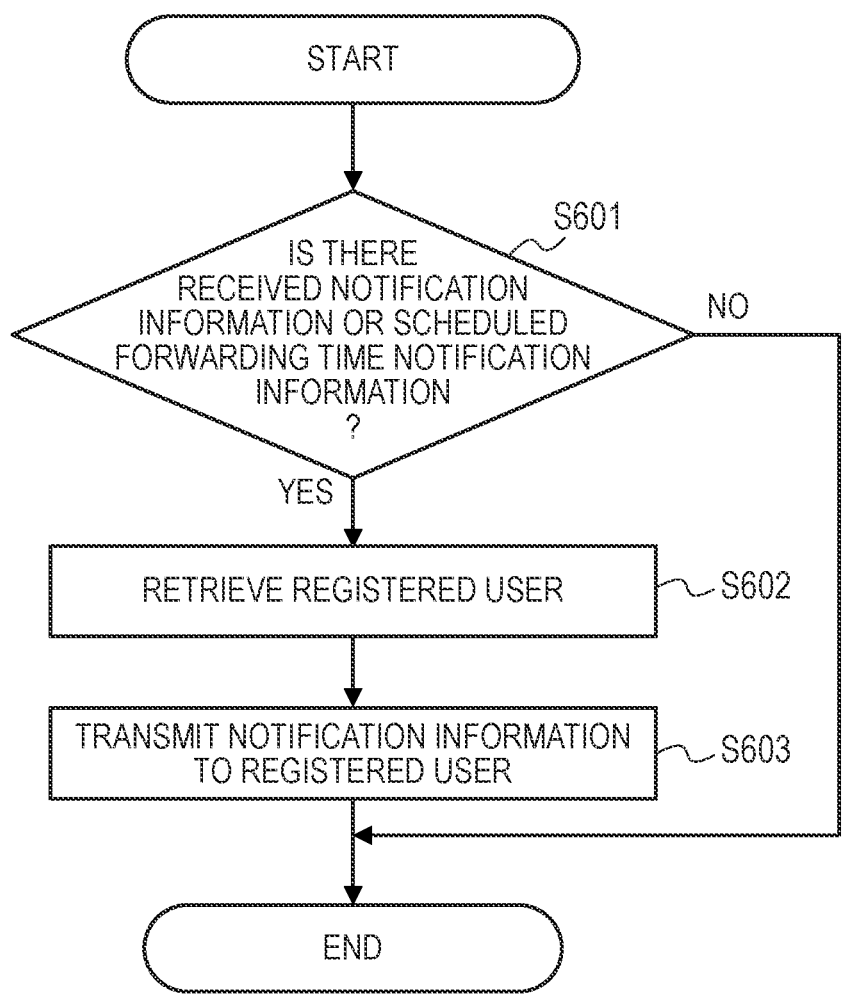

FIG. 7D

```
<FORWARDING TABLE REGISTRATION>
[REGISTER] [CANCEL]

FORWARDING TABLE NAME: [FORWARDING 1]
```

731 — SOURCE OF RECEIVED FAX DATA SETTING
　　　SELECTION RECEIVING LINE: ☐ INTERNET FAX
　　　　　　　　　　　　　　　　☑ FAX

732 — SOURCE ADDRESS SETTING: ⦿ FORWARD ALL RECEIVED FAX DATA
　　　　　　　　　　　　　　　 ○ FORWARD ONLY RECEIVED
　　　　　　　　　　　　　　　　 FAX DATA FROM SPECIFIED SOURCE

FORWARDING DESTINATION OF RECEIVED FAX DATA SETTING
733 — FORWARDING CONDITION:　○ NOT FORWARD
　　　　　　　　　　　　　　　○ ALWAYS FORWARD
　　　　　　　　　　　　　　　⦿ FORWARD ONLY RECEIVED FAX
　　　　　　　　　　　　　　　　DATA AT SPECIFIED DATE AND TIME

734 — DAY OF WEEK:　☐ MONDAY　☐ TUESDAY　☑ WEDNESDAY
　　　　　　　　　　☐ THURSDAY　☑ FRIDAY　☑ SATURDAY
　　　　　　　　　　☑ SUNDAY

735 — FORWARDING ADDRESS LIST:

[ADD (FROM ADDRESS BOOK)] [ADD (DIRECT INPUT)] [DELETE]

| DESTINATION NAME | TYPE | ADDRESS |
|---|---|---|
| AAA | FAX | 075-××××-×××× |
| BBB | FAX | 075-△△△△-△△△△ |
| CCC | FAX | 075-○○○○-○○○○ |

IMAGE PROCESSING APPARATUS, METHOD OF CONTROLLING IMAGE PROCESSING APPARATUS, AND STORAGE MEDIUM FOR CONTROLLING FORWARDING OF DATA

BACKGROUND OF THE DISCLOSURE

Field of the Disclosure

The present disclosure relates to an image processing apparatus comprising a function receiving data from a facsimile, a method of controlling the image processing apparatus, and a storage medium.

Description of the Related Art

Some image processing apparatuses have a function to notify a notification destination such as a pre-registered email address of received information in response to receiving data from a facsimile (hereinafter referred to as "FAX"). However, the function notifies information unilaterally. If instructing other FAX processing, a user cannot set an instruction to process the data from the FAX to the image forming apparatus when the user is away from the image forming apparatus because the user has to set the instruction to the image processing apparatus via the operation unit of the image processing apparatus.

Japanese Patent Application Laid-Open No. 2021-064919 discloses a technology that uses a chat application on a terminal device to notify reception and issue processing instructions when receiving data from FAX. In the chat application, it is possible to display received information and received images and to issue processing instructions, such as forwarding the received data.

Some image processing apparatuses have a function to forward the received data at the scheduled time and transmit a fax document when the user is out of the office and at night when the communication charge is low.

As described above, Japanese Patent Application Laid-Open No. 2021-064919 discloses that the information and images received from FAX can be confirmed in the chat application. However, if the image processing apparatus forward the data received from FAX at a scheduled time, the user cannot confirm the scheduled time to forward the data in the chat application. The user has to confirm the scheduled time on a setting screen of the operation unit of the image processing apparatus. Therefore, the user cannot cancel to forward the data and change the scheduled time and destination via the chat application. The user has to confirm and change the scheduled time and destination on the settings screen of the operation unit of the image processing apparatus.

SUMMARY OF THE DISCLOSURE

Embodiments of the present disclosure have been made to solve the above issues. The present disclosure provides a scheme to improve the usability of a function to forward data received from a facsimile by enabling a user to confirm the scheduled time of forwarding the data received on the image processing apparatus via a network communication service.

According to embodiments of the present disclosure, an image processing apparatus receiving data from a facsimile comprises one or more memories and one or more processors that execute instructions to manage a destination and a scheduled time setting to forward the data received from the facsimile and post a message indicating that the data is received to a message communication service in response to receiving the data from the facsimile, wherein the message is posted based on the managed scheduled time setting and the message indicates the scheduled time when the data is forwarded.

Further features of the present disclosure will become apparent from the following description of exemplary embodiments with reference to the attached drawings.

BRIEF DESCRIPTION OF THE DRAWINGS

FIG. 6 illustrates a flowchart showing processing performed by the chat server to notify the registered user of information.

FIG. 7D illustrates an example showing the notification setting screen of the chat application in the image forming apparatus.

DESCRIPTION OF THE EMBODIMENTS

Embodiments of the present disclosure will be described in detail below with reference to the drawings.

First Embodiment

In the first embodiment, when an image forming apparatus receives data from a facsimile apparatus, the image forming apparatus notifies a chat application in a terminal device of received information and scheduled forwarding time, cancels to forward the data, and changes the scheduled forwarding time and destination according to instructions. Hereafter, "facsimile" is also referred to as "FAX", "fax", or "fax". The "F-code" will be described later.

Figure 1:
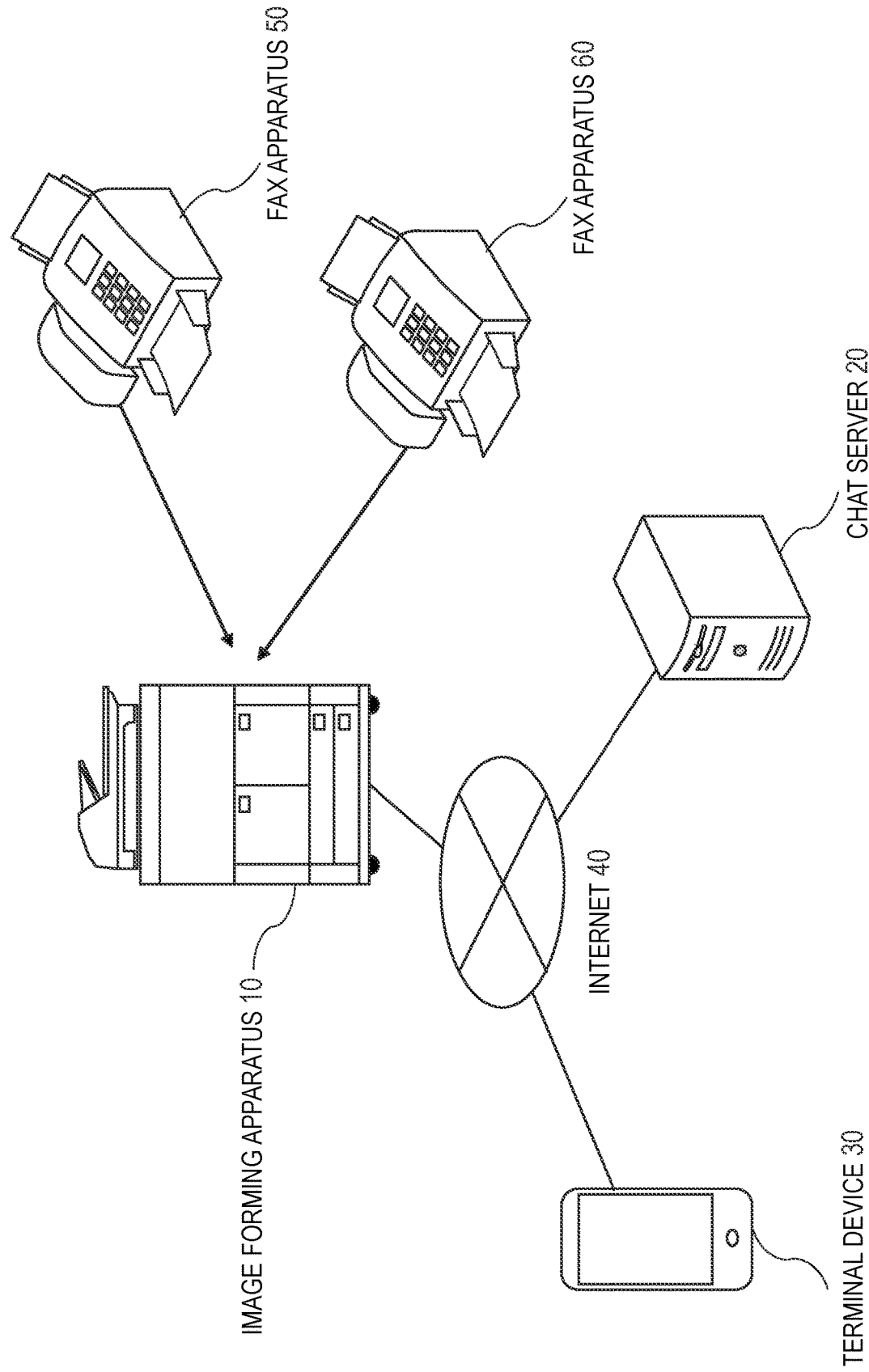
FIG. 1 illustrates an example showing a configuration of a reception notification system according to the present embodiment.

FIG. 1 illustrates an example showing a configuration of a FAX reception notification system according to the present embodiment in the present disclosure. The FAX reception notification system in the present embodiment comprises an image forming apparatus 10, a chat server 20, and a terminal device 30.

The image forming apparatus 10, the chat server 20, and the terminal device 30 are connected via an internet 40. In this system, an external FAX apparatus 50, an external FAX apparatus 60, and the image forming apparatus 10 are connected via a PSTN (Public Telephone Network) to enable FAX transmission and reception. In the present embodiment, the FAX apparatus 50 transmits the data to the image forming apparatus 10 and the transmitted data is forwarded to the FAX apparatus 60. The image forming apparatus 10 and the FAX apparatus 50 may be connected via the internet 40 for FAX transmission and reception.

Figure 2:
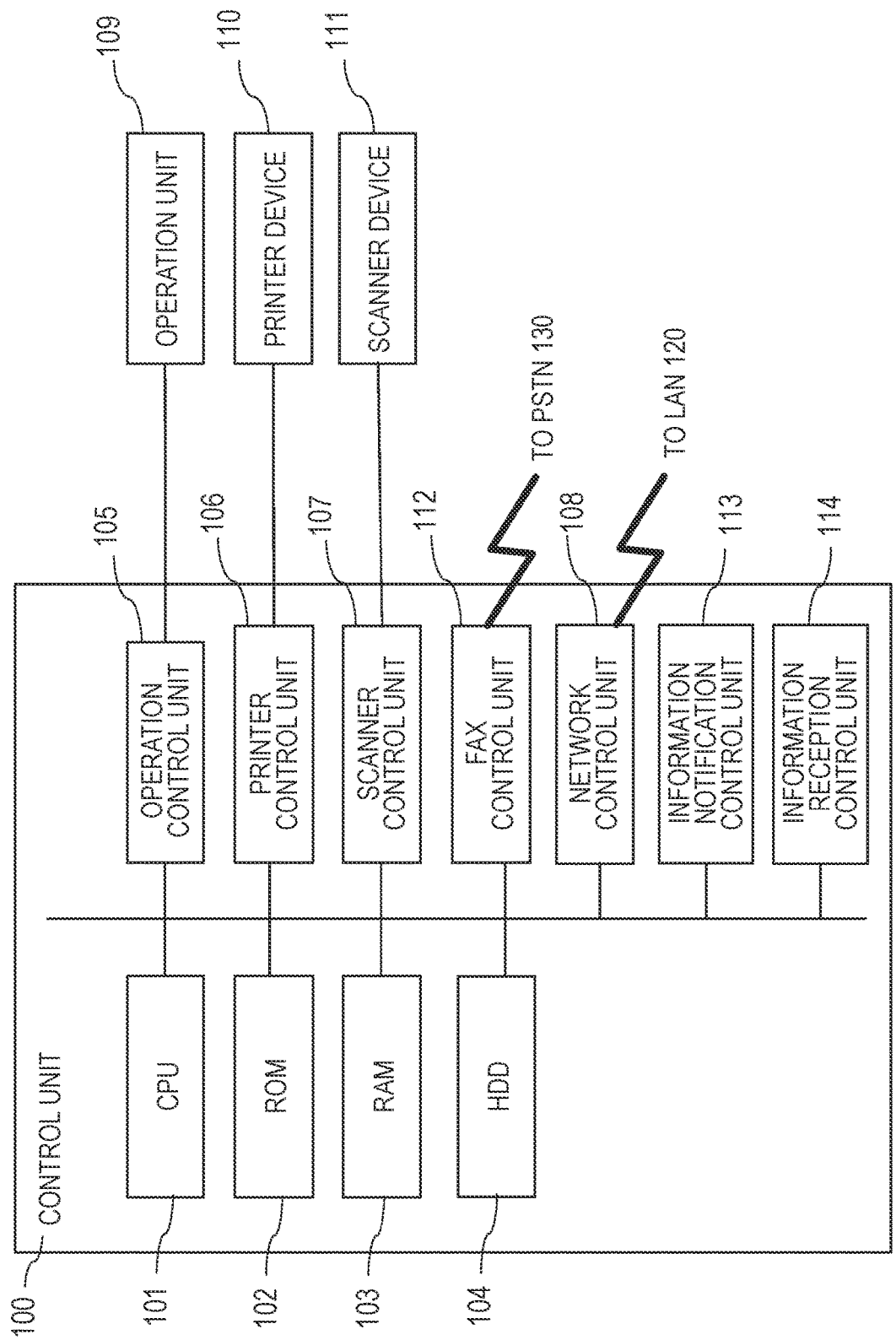
FIG. 2 illustrates an example showing a configuration of an image forming apparatus.

FIG. 2 illustrates an example showing a configuration of the image forming apparatus 10. A control unit 100 including a CPU 101 controls the operation of the entire image forming apparatus 10. The CPU 101 reads control programs stored in a ROM 102 to perform various controls such as read control and transmission control. The ROM 102 is a boot ROM and stores a boot program of the system. A RAM 103 is used as a temporary storage area such as a main memory and work area of the CPU 101.

A HDD (Hard Disk Drive) 104 stores image data, various programs, or various information tables. The HDD 104 is also used for storing scanned documents and the like, and for temporarily storing FAX data received from the FAX apparatus 50. Other storage apparatus such as a SSD (Solid State Drive) may be provided instead of or in combination with the HDD 104.

An operation control unit 105 is an interface for connecting an operation unit 109 and the control unit 100. The operation unit 109 includes a liquid crystal display unit with a touch panel function, a keyboard, and the like. A printer control unit 106 is an interface for connecting a printer 110 and the control unit 100. Image data to be printed by the printer 110 is transmitted from the control unit 100 via the printer control unit 106 and printed on a recording medium (on paper) by the printer 110. A scanner control unit 107 is an interface for connecting a scanner 111 and the control unit 100. The scanner 111 scans images on documents to generate image data and inputs the image data to the control unit 100 via the scanner control unit 107.

A FAX control unit 112 is connected to a telephone line such as a PSTN 130 and the like and transmits/receives the FAX data to/from other FAX apparatus 50 via the telephone line. That is, the image forming apparatus 10 is an image processing apparatus with functions of transmitting/receiving to/from the FAX.

If the FAX control unit 112 transmits the FAX data, a FAX transmission processing is performed in response to setting the document in the scanner 111 and operating the FAX transmission processing via the operation unit 109. Then, when the communication procedure with the other unity is possible, sequential transmission processing is performed to the other unity via a communication line. If the FAX control unit 112 receives the FAX data, the FAX control unit 112 acquires received information to store the received information in the HDD 104 while the FAX control unit performs communication processing. The received information acquired is, for example, telephone number information, TSI (Transmitting Subscriber Identification Signal), received time, and received image. In the image forming apparatus 10, image data is subjected to various types of image processing as needed, and is output from the printer 110 via the printer control unit 106.

An information notification control unit 113 analyzes the received information received from the FAX apparatus 50 to create received notification information, and notifies the terminal device 30 via the chat server 20. An information reception control unit 114 receives a processing instruction from the chat server 20 and executes the processing corresponding to the processing instruction. For example, the information reception control unit 114 receives the processing instruction input by a user at the terminal device 30 via the chat server 20. The information notification control unit 113 and the information reception control unit 114 are realized when, for example, the CPU 101 reads and executes control programs stored in the ROM 102 or the like.

A network control unit 108 is an interface for connecting the control unit 100 to LAN 120. The network control unit 108 transmits and receives information to external apparatuses connected to the internet 40 via the LAN 120.

The functions of the image forming apparatus 10 are described below. Typical functions (applications) of the image forming apparatus 10 are as follows.

(a) A function "copy" that scans the images on the document by the scanner 111 and prints the generated image data by the printer 110.

(b) A function "print" that prints image data by the printer 110 based on a print job transmitted from an external apparatus such as a client PC.

(c) A function "scan and transmit" that scans the images on the document by the scanner 111 and transmits the generated image data to the external apparatuses and the like from the network control unit 108.

(d) A function "scan and store" that scans the images on the document by the scanner 111 and stores the generated image data in the HDD 104.

(e) A function "use stored file" that prints the image data stored in the HDD 104 by the printer 110 or transmits the image data to the external apparatuses and the like via the network control unit 108.

(f) A function "browser" that views, prints, and stores data on a web server via a web browser.

(g) A function "FAX" that transmits and receives the documents to and from the FAX apparatus 50 via the telephone line.

Figure 11:
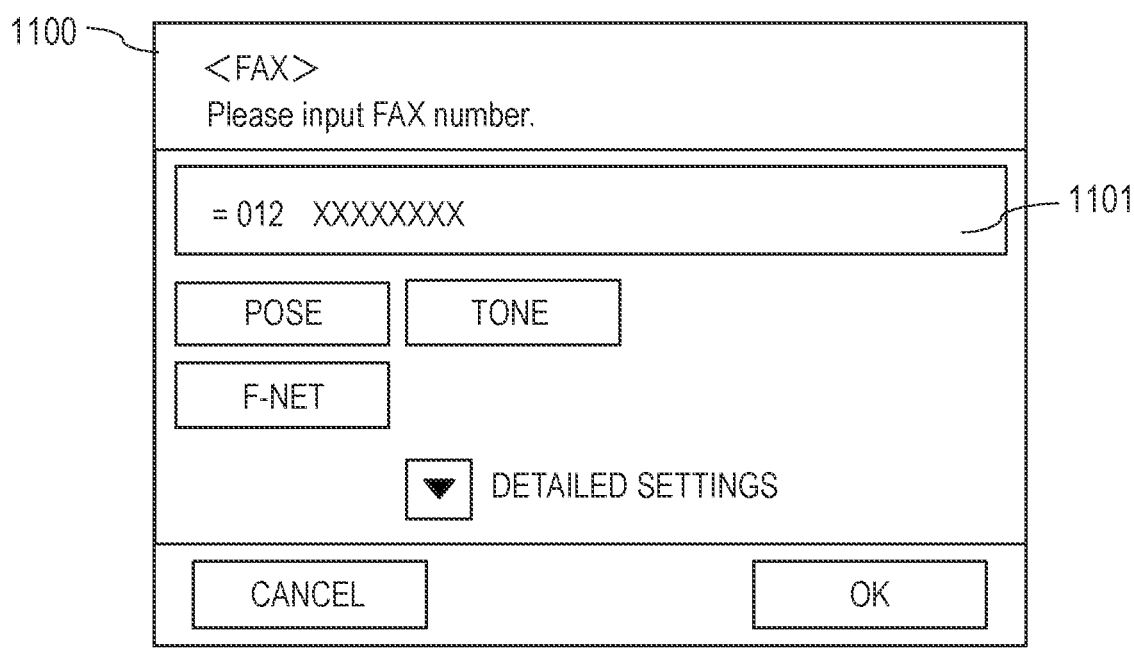
FIG. 11 illustrates a diagram showing a FAX screen displayed when a FAX function is activated by the user via the operation unit of the image forming apparatus.

An example of a screen in the FAX function according to the present embodiment will be described with reference to FIG. 11. FIG. 11 illustrates an example showing a fax screen 1100 displayed when the FAX function (FAX application) is activated by the user via the operation unit 109 of the image forming apparatus 10.

In the fax screen 1100, a destination number input field 1101 is for inputting a destination telephone number to transmit the FAX data. The user sets setting values via the fax screen 1100 and the setting values are stored in a memory such as HDD 104.

Figure 3:
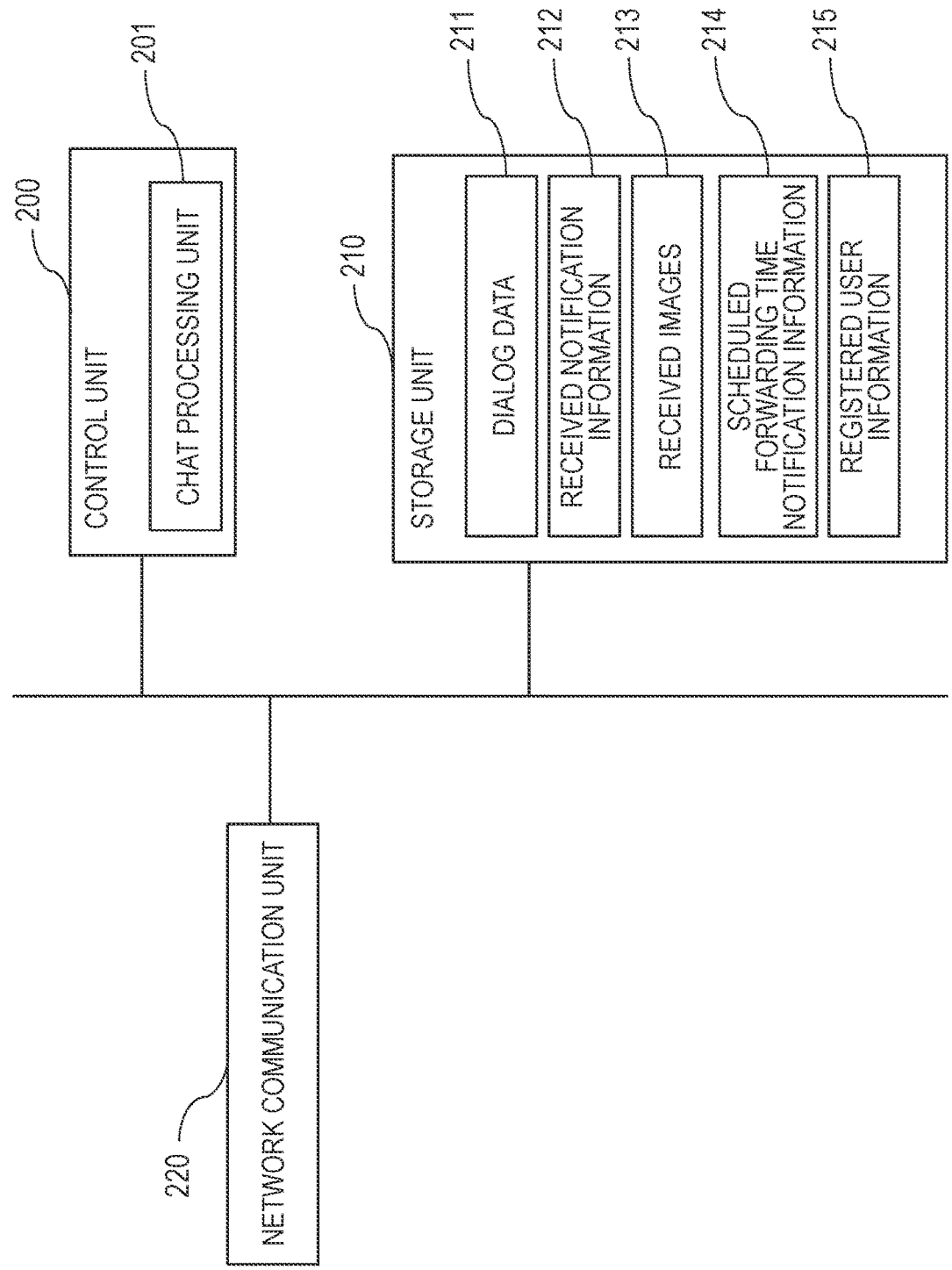
FIG. 3 illustrates an example showing a configuration of a chat server.

FIG. 3 illustrates a block diagram showing an example of the configuration of the chat server 20. The chat server 20 includes a control unit 200, a storage unit 210, and a network communication unit 220. The chat server 20 provides a message communication service (hereinafter referred to as a "chat service") to the terminal device 30, and the like. The image forming apparatus 10 of the present embodiment cooperates with the chat service via the chat server 20.

The control unit 200 includes a chat processing unit 201. The chat processing unit 201 analyzes a chat text (a message posted for the chat service) received from the terminal device 30, acquires an appropriate chat text from dialogue data 211, and responds to the terminal device 30. The chat processing unit 201 is realized by, for example, the control unit 200 reading and executing programs stored in the storage apparatus such as the storage unit 210.

The network communication unit 220 receives various messages such as FAX received notification information (a message indicating that a FAX has been received) from the image forming apparatus 10 via the internet 40.

The storage unit 210 stores the dialogue data 211, received notification information 212, received images 213, scheduled forwarding time notification information 214, registered user information 215, and the like. The dialogue data 211 is dialogue data for performing chat processing and stores chat text necessary for the dialogue processing including chat text learned by the AI. The received notification information 212 stores notification information of the FAX data received from the image forming apparatus 10. The received images 213 store the images received from the image forming apparatus 10.

The scheduled forwarding time notification information 214 stores the scheduled forwarding time notification information of the FAX data received from the image forming apparatus 10. The registered user information 215 is the registration information of the terminal device for performing chat. The user registers the image forming apparatus 10 as a chat partner via the terminal device 30 to store the notification destination information of the terminal device for performing chat as the registered user information 215.

Figure 4:
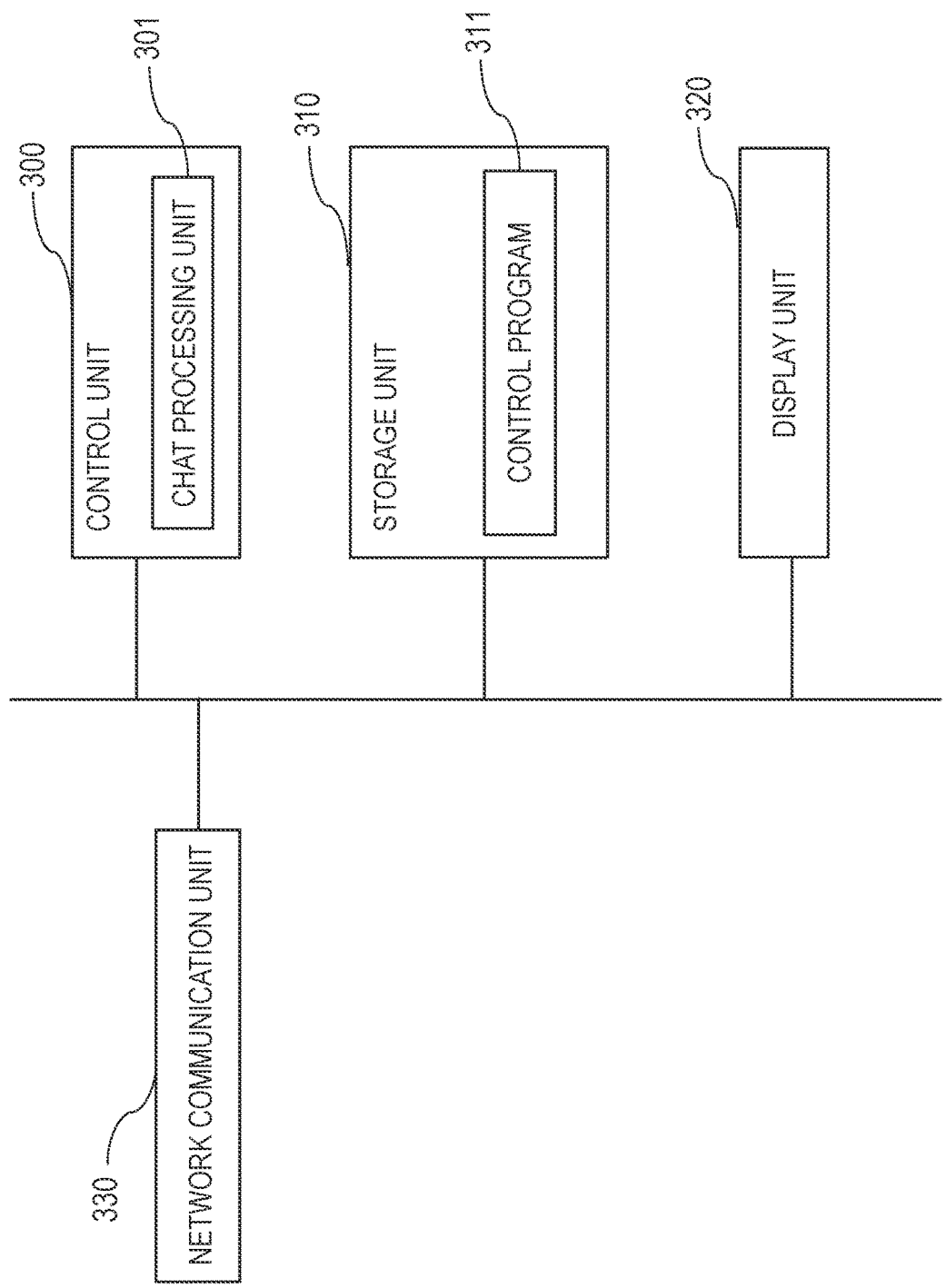
FIG. 4 illustrates an example showing a configuration of a terminal device.

FIG. 4 illustrates a block diagram showing an example of the configuration of the terminal device 30. The terminal device 30 is an information processing device such as a smartphone, PC (personal computer), tablet, and the like. The terminal device 30 includes a control unit 300, a storage unit 310, a display unit 320, and a network communication unit 330.

The control unit 300 realizes various processes by reading and executing a control program 311 stored in the storage unit 310. The control program 311 also includes an interactive application (a chat processing unit 301) for interacting with the chat server 20. That is, the chat processing unit 301 is realized when the control unit 300 reads and executes the control program 311 stored in the storage unit 310.

The display unit 320 includes, for example, a display with a touch panel, and displays status of the terminal device 30 and receives operation. The display unit 320 displays the chat application screen of the interactive application, displays the chat text on the chat application screen, and receives the chat text input from the user. The network communication unit 330 is connected to the image forming apparatus 10 via the internet 40 and receives FAX received notification information from the image forming apparatus 10.

Figure 5:
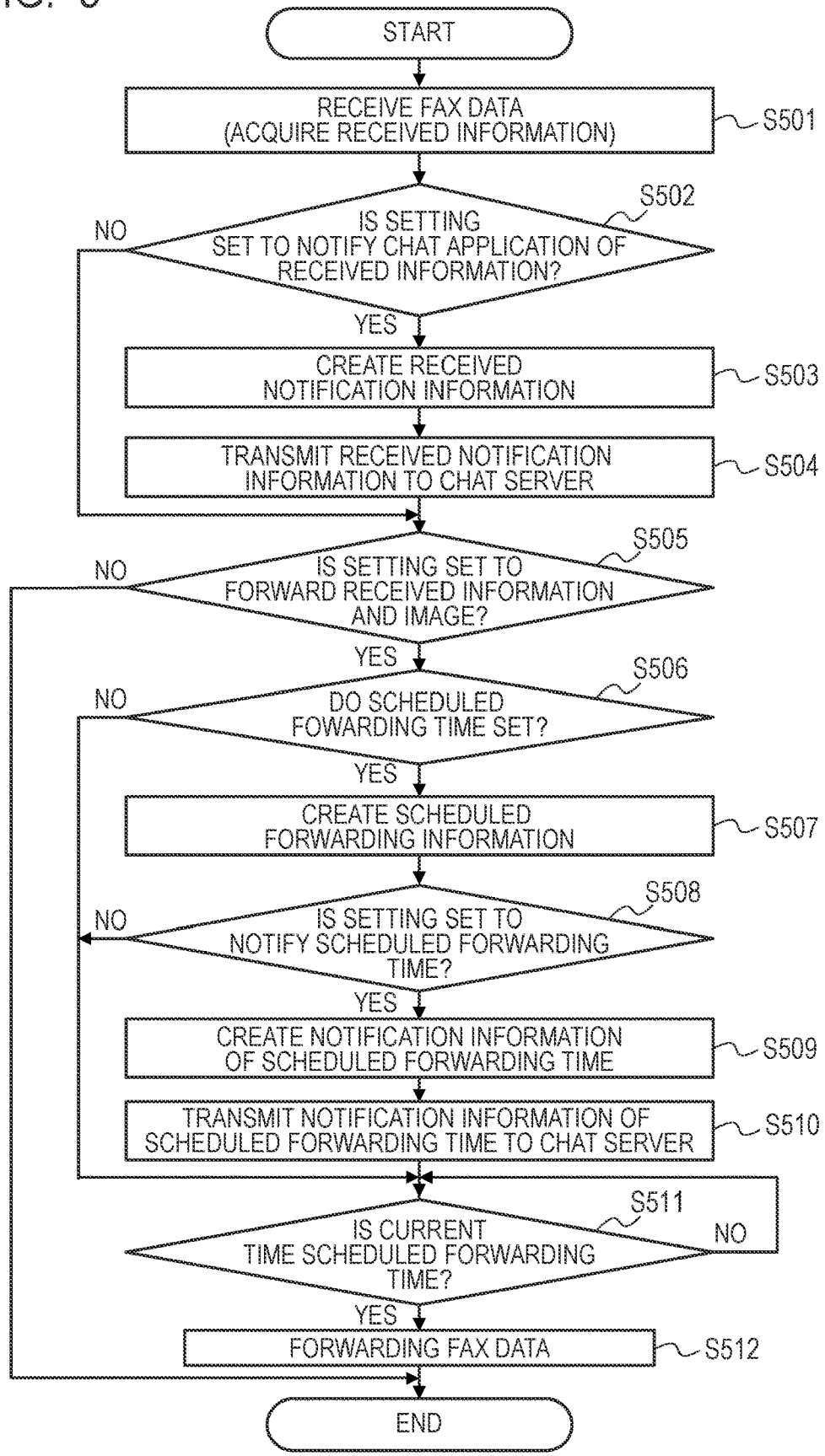
FIG. 5 illustrates a flowchart showing processing performed by the image forming apparatus when receiving data from a facsimile.

The operation of the image forming apparatus 10 is described below. FIG. 5 illustrates a flowchart showing an example of processing in which, when the image forming apparatus 10 receives the FAX data from the FAX apparatus 50, the image forming apparatus 10 notifies the terminal device 30 of the received information and the scheduled forwarding time via the chat server 20. The processing by the CPU 101 in the flowchart is realized when the CPU 101 reads and executes control programs stored in the ROM 102 or the like. FIGS. 7A to 7E illustrate an example showing the chat application notification setting screen in the image forming apparatus 10. Hereafter, FIGS. 7A to 7E are collectively referred to as "FIG. 7". FIGS. 8A to 8E illustrate an example showing the chat application screen displayed on the display unit 320 of the terminal device 30. Hereafter, FIGS. 8A to 8E are collectively referred to as "FIG. 8".

In step S501, when the CPU 101 receives the FAX data from the FAX apparatus 50 in the FAX control unit 112 via the PSTN, the CPU 101 acquires the received information and the received images to store the acquired received information and the received images in an HDD 104 or the like. Then, in step S502, the CPU 101 determines whether or not a notification setting when the fax data is received is set to notify the chat application. Here, the notification setting is described using FIG. 7A.

Figure 7A:
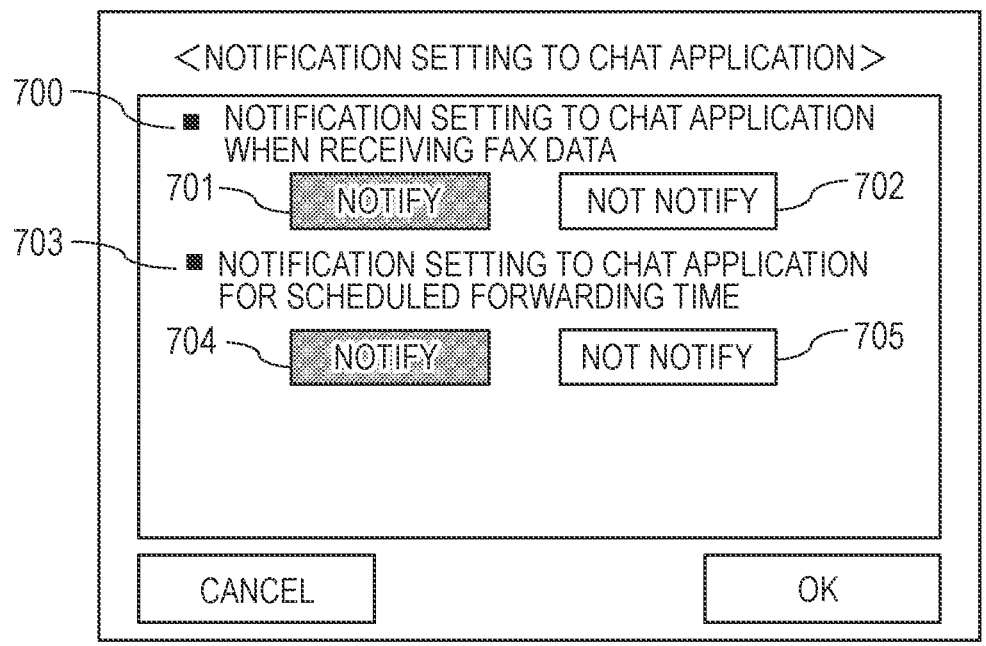
FIG. 7A illustrates an example showing a notification setting screen of a chat application in the image forming apparatus.

FIG. 7A illustrates a diagram showing an example of the notification setting screen for notifying the chat application of the terminal device 30 when receiving the fax data by the image forming apparatus 10. The chat application notification setting item 700 when receiving the fax data is a screen for setting whether or not the image forming apparatus 10 notifies the chat application of the terminal device 30 when receiving the fax data. The chat application notification setting screen is displayed by performing a predetermined operation in the operation unit 109 of the image forming apparatus 10.

If the user sets the setting item 700 to "notify" 701 in the chat application notification setting screen, the image forming apparatus 10 notifies the chat application of the terminal device 30 of the received information upon receiving the fax data. If the user sets the setting item 700 to "not notify" 702, the image forming apparatus 10 does not notify the chat application of the terminal device 30 of the received information upon receiving the fax data. By the user presses an "OK" button, the setting value in the chat application notification setting screen is stored in the HDD 104.

Hereafter, an explanation returns to the flowchart in FIG. 5. If the notification setting when the fax data is received is not set to notify the chat application (No in step S502), the CPU 101 advances the process to step S505. On the other hand, if the notification setting when the fax data is received is set to notify the chat application (Yes in step S502), the CPU 101 advances the process to step S503.

In step S503, the CPU 101 instructs the information notification control unit 113 to create the received notification information for notifying the chat server 20 based on the received information stored in the HDD 104. Then, in step S504, the CPU 101 instructs the information notification control unit 113 to transmit the received notification information created in step S503 from the network control unit 108 to the chat server 20 via the LAN 120. As a result, the message of the received notification information is notified to the terminal device 30 via the chat server 20, and is displayed on the chat application screen as shown in a message 801 in FIG. 8A, which will be described later. Thus, it is possible to present to the user that the FAX data is received. After the processing in step S504, the CPU 101 advances the process to step S505.

In step S505, the CPU 101 determines whether or not the received FAX data matches or not the forwarding condition of a forwarding setting of the received FAX data. Here, the forwarding setting of the received FAX data is described using FIGS. 7C and 7D.

Figure 7B:
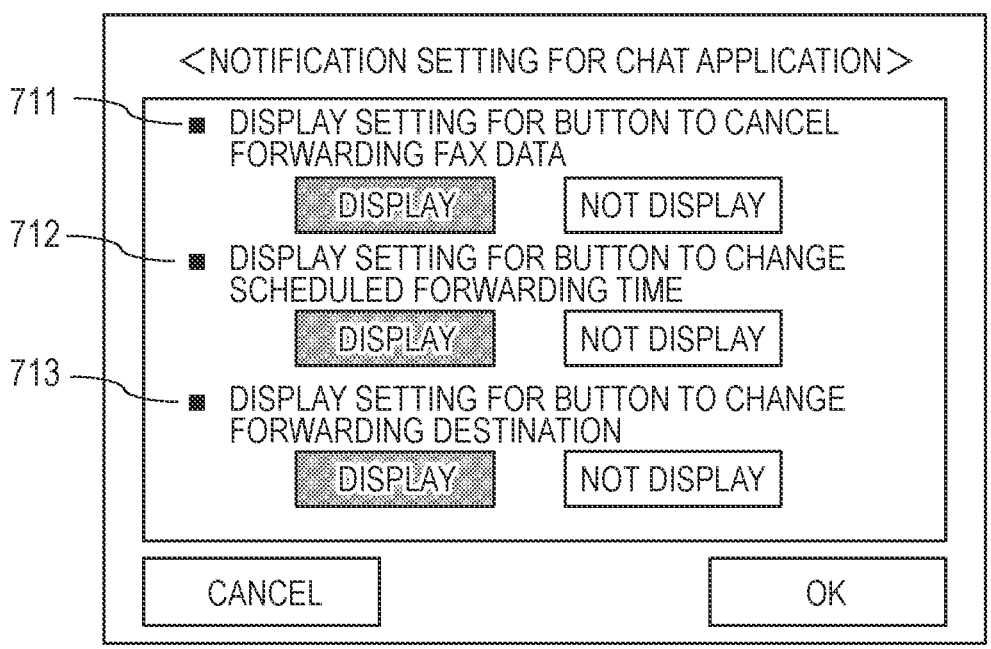
FIG. 7B illustrates an example showing the notification setting screen of the chat application in the image forming apparatus.
Figure 7C:
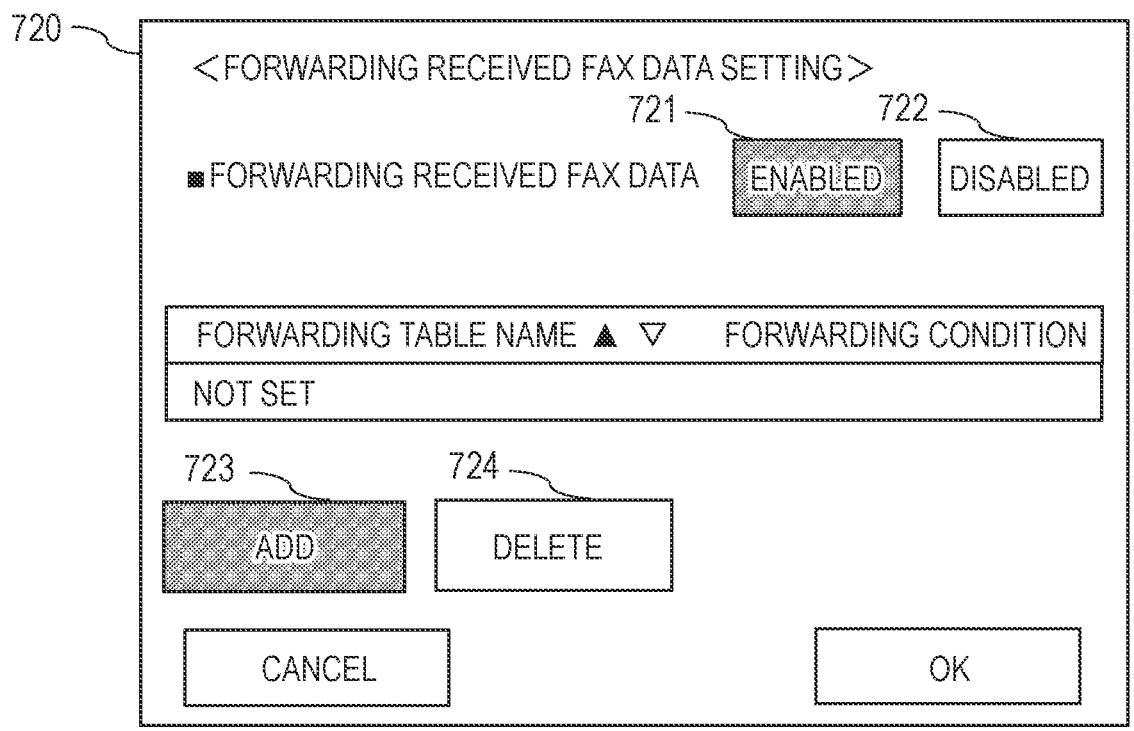
FIG. 7C illustrates an example showing the notification setting screen of the chat application in the image forming apparatus.

FIG. 7C illustrates an example showing the forwarding setting screen for forwarding the FAX data when the image forming apparatus 10 receives the FAX data. The forwarding setting screen 720 for forwarding received FAX data is a screen for setting whether or not the image forming apparatus 10 forwards the received FAX data. The forwarding setting screen 720 is displayed by performing a predetermined operation in the operation unit 109 of the image forming apparatus 10.

If an item "enable" 721 is set in the forwarding setting screen 720, the image forming apparatus 10 forwards the received FAX data. On the other hand, if an item "disable" 722 is set, the image forming apparatus 10 does not forward the received FAX data. A button "add" 723 is a button for creating and adding a forwarding table to register forwarding conditions. If the user presses "add" 723, the image forming apparatus 10 performs screen transition processing to a forwarding table registration screen 730 as shown in FIG. 7D from the forwarding setting screen 720. A button "delete" 724 is a button for deleting a specified forwarding table. By pressing an "OK" button on the forwarding setting screen 720, the setting value on the forwarding setting screen 720 is stored in the HDD 104.

FIG. 7D illustrates an example showing the forwarding table registration screen 730. The forwarding table registration screen 730 is a screen for setting forwarding conditions and forwarding destinations. In the forwarding table registration screen 730, a communication line selection item 731 is an item to select from which communication line the image forming apparatus 10 forwards the received FAX data by selecting the communication line. For example, if the checkbox indicating "FAX" is selected as shown in FIG. 7D, the image forming apparatus 10 forwards only received FAX data transmitted via the FAX line. A source address setting item 732 is an item to select whether to "forward all received data" or "forward only received FAX data from a specified source".

A forwarding condition item 733 is an item to select whether to forward only data received at a specified date and time, always forward, or not forward. The day of the week item 734 is a setting item that is effective only when the forwarding condition item 733 is set to "forward only data received at a specified date and time", and by setting the day of the week, only the FAX data received on a specified day of the week can be forwarded. A forwarding destination list item 735 is an item to set the forwarding destination of the received FAX data, and the user can set the forwarding destination by selecting the forwarding destination from the address book stored in the HDD 104 or by directly inputting the forwarding destination on a destination input screen. By pressing a "register" button on the upper part of the forwarding table registration screen 730, the setting value on the forwarding table registration screen 730 is stored in the HDD 104.

Hereafter, an explanation returns to the description of the flowchart in FIG. 5. In step S505, the CPU 101 determines whether or not the received FAX data matches the forwarding conditions set via the screen as in FIG. 7D. If the received FAX data do not match the forwarding conditions (No in step S505), the CPU 101 terminates the processing of the flowchart. On the other hand, if the received FAX data matches the forwarding conditions (Yes in step S505), the CPU 101 advances the process to step S506.

Figure 7E:
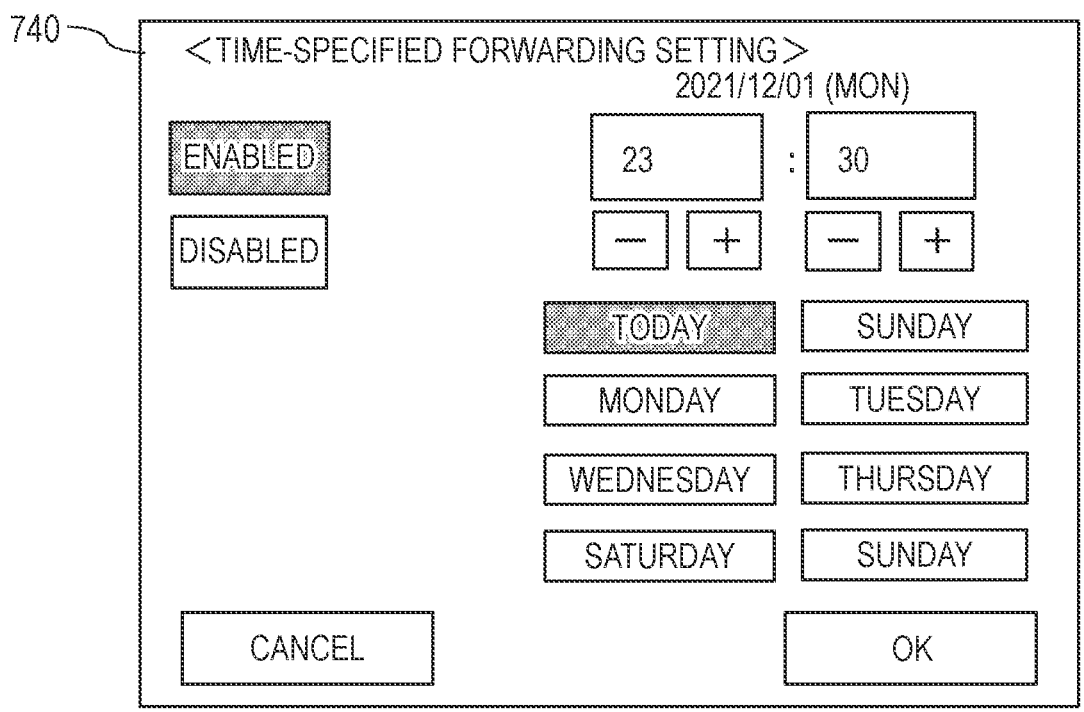
FIG. 7E illustrates an example showing the notification setting screen of the chat application in the image forming apparatus.

In step S506, the CPU 101 determines whether or not the scheduled forwarding time is set in the forwarding setting of the received FAX data. The scheduled forwarding time setting is described here with reference to FIG. 7E. FIG. 7E illustrates an example showing a designation of transmission time screen 740. In the designation of transmission time screen 740, the user can designate the transmission time in order to transmit the FAX data when the person is away or at night when communication charges are low. The designation of transmission time screen 740 is displayed by performing a predetermined operation in the operation unit 109 of the image forming apparatus 10. If the transmission time is designated via the designation of transmission time screen 740, the image forming apparatus 10 forwards the received FAX data at the designated time. That is, it is determined that the scheduled forwarding time is set. By pressing an "OK" button on the designation of transmission time screen 740, the setting value on the designation of transmission time screen 740 is stored in the HDD 104.

Hereafter, an explanation returns to the description of the flowchart in FIG. 5. If the scheduled forwarding time of the received FAX data is not set (No in step S506), the CPU 101 creates scheduled forwarding information of the FAX data based on the current time information and the forwarding destination information to store the scheduled forwarding information of the FAX data in the HDD 104 (step not shown), and advances the process to step S511.

On the other hand, if the scheduled forwarding time of the received FAX data setting is set (Yes in step S506), the CPU 101 advances the process to step S507. In step S507, the CPU 101 creates scheduled forwarding information of the FAX data based on the scheduled forwarding time information and the forwarding destination information stored in the HDD 104 to store the scheduled forwarding information of the FAX data in the HDD 104. Then, the CPU 101 advances the process to step S508.

In step S508, the CPU 101 determines whether or not the notification setting is the setting for notifying the chat application of the receiving FAX data at the scheduled forwarding time. In FIG. 7A, if the user sets a chat application notification setting item 703 to "notify" 704, the image forming apparatus 10 notifies the scheduled forwarding time information to the chat application of the terminal device 30 (via the chat server 20 in step S510). On the other hand, if the user sets the chat application notification setting item 703 to "not notify" 705, the image forming apparatus 10 does not notify the scheduled forwarding time information to the chat application of the terminal device 30.

If the user sets the scheduled forwarding time information notification setting to the chat application not to notify the chat application (No in step S508), the CPU 101 advances the process to step S511. On the other hand, if the user sets the scheduled forwarding time information notification setting to the chat application to notify the chat application (Yes in step S508), the CPU 101 advances the process to step S509.

In step S509, the CPU 101 instructs the information notification control unit 113 to create scheduled forwarding time notification information for notifying the chat server 20 based on the scheduled forwarding time information stored in the HDD 104. Further, the CPU 101 adds button display settings to the scheduled forwarding time notification information based on the display settings for canceling the forwarding, changing the forwarding time, and changing the forwarding destination buttons stored in the HDD 104.

Then, in step S510, the CPU 101 instructs the information notification control unit 113 to transmit the scheduled forwarding time notification information created in step S509 from the network control unit 108 to the chat server 20 via the LAN 120. As a result, the message of the scheduled forwarding time notification information is notified to the terminal device 30 via the chat server 20, and is displayed on the chat application screen as shown in message 802 in FIG. 8B, which will be described later. Therefore, the user can be presented the scheduled forwarding time of the FAX data and buttons for instructing the user to cancel the forwarding, change the forwarding time, and change the forwarding destination. In the above description, the button display setting is added to the scheduled forwarding time notification information in step S509. However, the message for displaying the buttons for instructing the user to cancel the transfer, change the transfer time, or change the destination may be generated and transmitted to the chat server 20 based on the button display setting of the scheduled forwarding time information separately from the scheduled forwarding time of the FAX data. After the processing in step S510, the CPU 101 advances the processing to step S511.

In step S511, the FAX control unit 112 refers to the scheduled forwarding time of the scheduled forwarding information of the FAX data created in step S507, and the like, and determines whether or not the current time has passed the scheduled forwarding time. If the scheduled forwarding time has not yet arrived (No in step S511), the CPU 101 repeats the process in step S511. On the other hand, if the scheduled forwarding time has already arrived (Yes in step S511), the CPU 101 advances the process to step S512. In step S512, the FAX control unit 112 refers to the destination information of the scheduled forwarding information of the FAX data created in step S507, forwards the received FAX data to the specified destination, and terminates the processing of the flowchart.

FIG. 6 illustrates a flowchart showing an example of processing in which the chat server 20 notifies the registered user of information. The processing of the chat processing unit 201 in the flowchart is realized by the control unit 200 reads and executes a program stored in the storage apparatus such as the storage unit 210.

In step S601, the chat processing unit 201 of the control unit 200 of the chat server 20 determines whether there is received notification information or scheduled forwarding time notification information transmitted from the image forming apparatus 10. If there is no received notification information or scheduled forwarding time notification information (No in step S601), the chat processing unit 201 terminates the processing of the flowchart. On the other hand, if there is received notification information or scheduled forwarding time notification information (Yes in step S601), the chat processing unit 201 advances the process to step S602.

In step S602, the chat processing unit 201 retrieves the registered user information of the forwarding destination from registered user information 215 in the storage unit 210. It is assumed that the information registered user of the transfer destination is pre-registered as the registered user information 215. Next, in step S603, the chat processing unit 201 transmits the received notification information or the scheduled forwarding time notification information received in step S601 to the registered user retrieved in step S602 using the chat application.

Here, if the received notification information or the scheduled forwarding time notification information is received in step S601, the configuration for transmitting the received notification information or the scheduled forwarding time notification information to the registered user using the chat application is described. However, the information received from the image forming apparatus 10 and transmitted to the registered user is not limited to the received notification information or the scheduled forwarding time notification information. For example, the chat processing unit 201 can receive other information such as the received image and button display information from the image forming apparatus 10 and transmit a message based on the received information to the registered user.

Figure 9:
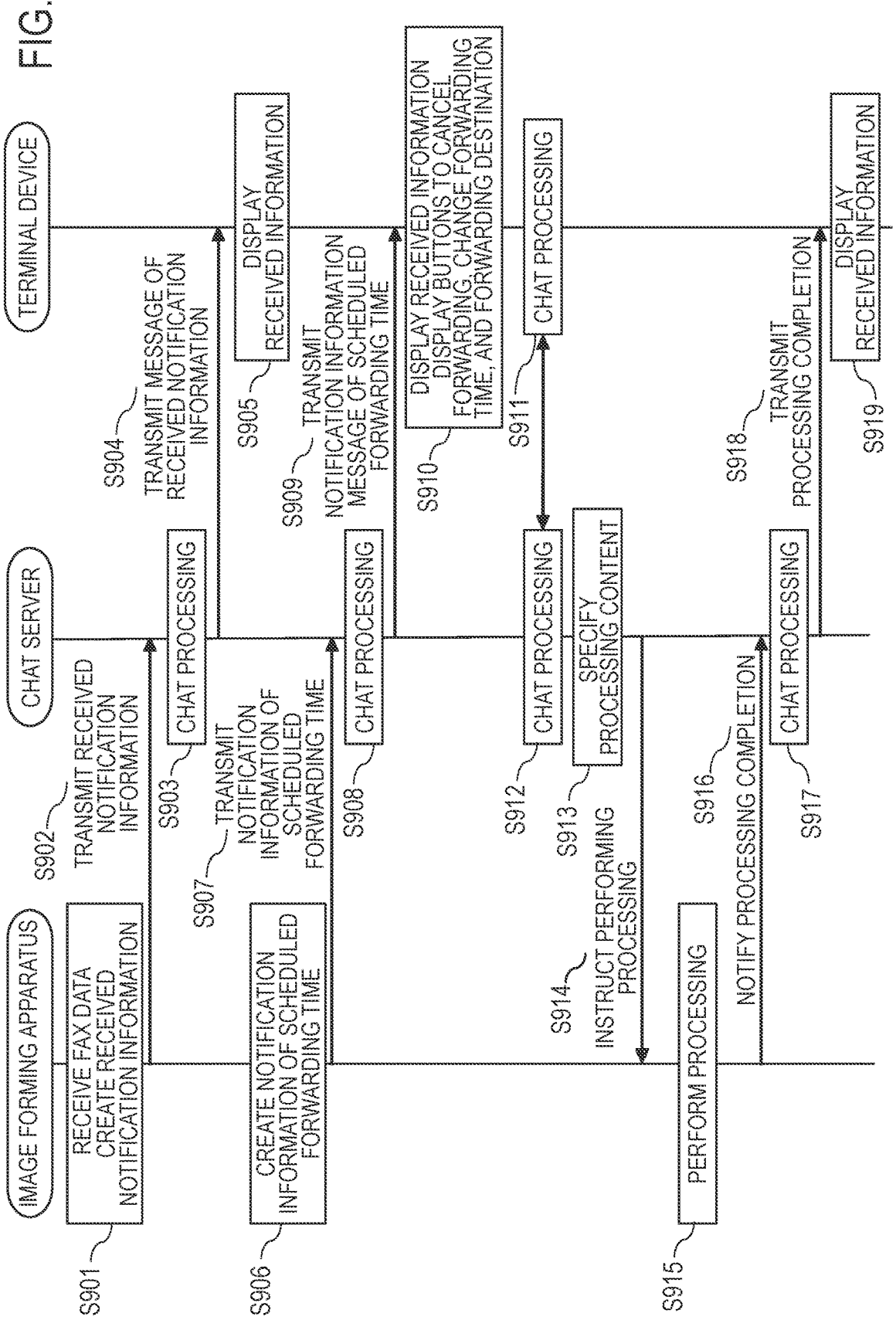
FIG. 9 illustrates a sequence in which the image forming apparatus notifies the terminal device of the received information when receiving data from FAX.

FIG. 9 illustrates an example showing a sequence in which the image forming apparatus 10 notifies the terminal device 30 of the received information when receiving the FAX data. In step S901, the image forming apparatus 10 receives the FAX data from the FAX apparatus 50. At that time, the image forming apparatus 10 acquires the received information to create received notification information based on the received information and store the received notification information in the HDD 104. In step S902, the image forming apparatus 10 transmits the received notification information stored in the HDD 104 in step S901 to the chat server 20. Here, it is assumed that the user sets the setting item 700 to "notify" 701 as the reception information notification setting for the chat application.

In step S903, the chat server 20 stores the received notification information received from the image forming apparatus 10 in the received notification information 212 of the storage unit 210. The chat processing unit of the control unit 200 analyzes the received notification information stored in the received notification information 212 and creates a chat message about the reception information from the dialogue data 211. In step S904, the chat server 20 transmits the chat message about the reception information created in step S903 to the terminal device 30.

Figure 8A:
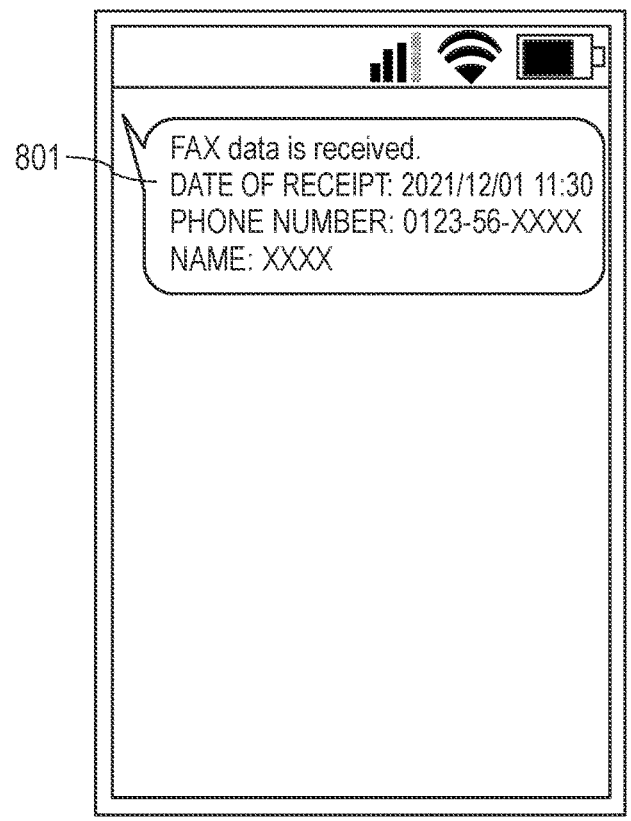
FIG. 8A illustrates an example showing a screen of a chat application displayed on a display unit of the terminal device.

In step S905, the terminal device 30 receives the message about the received notification information from the chat server 20 in the chat processing unit 301 of the control unit 300. The control program 311 of the storage unit 310 also starts the chat application and displays the chat message received from the chat server 20 in the display unit 320 (for example, a message 801 in FIG. 8A). FIG. 8A illustrates a diagram showing an example of the chat application screen when the terminal device 30 receives a message of notification information. The date and time of reception, the telephone number and the name of the transmitter are displayed on the message 801 as notification information. Here, the image information of the received FAX data may be displayed as notification information. In this case, for example, the image forming apparatus 10 transmits the received image (image information of the received FAX data) to the chat server 20 at the timing of step S902, and the chat server 20 creates a chat message for displaying the received image and transmits the chat message to the terminal device 30.

In step S906, the image forming apparatus 10 determines whether or not the received FAX data satisfy all the conditions of steps S505, S506, and S508 in FIG. 5. For example, the image forming apparatus 10 determines that the forwarding conditions such as the communication line selection item 731 and the source address setting item 732 are satisfied, the scheduled forwarding time such as the designation of transmission time screen 740 is set, and the chat application notification setting item 703 is set to "notify" 704. If the conditions are satisfied, the image forming apparatus 10 creates the scheduled forwarding time notification information based on the scheduled forwarding time information stored in the HDD 104 and stores the scheduled forwarding time notification information in the HDD 104. Moreover, the image forming apparatus 10 adds button display settings to the scheduled forwarding time notification information and stores the scheduled forwarding time notification information in the HDD 104 based on the display settings of cancel the forwarding, change the forwarding time, and change the forwarding destination buttons stored in the HDD 104. Here, the display settings of cancel the forwarding, change the forwarding time, and change the forwarding destination buttons are described with reference to FIG. 7B.

FIG. 7B illustrates an example showing the chat application notification setting screen for forwarding the FAX data. A setting item 711 for displaying a button to cancel the forwarding the FAX data is an item for setting whether or not to display a button to cancel the forwarding in the chat application of the terminal device 30. A setting item 712 for displaying a button to change the scheduled forwarding time of the FAX data is an item for setting whether or not to display a button to change the scheduled forwarding time in the chat application of the terminal device 30. A setting item 713 for displaying a button to change the forwarding destination is an item for setting whether or not to display a button to change the forwarding destination in the chat application of the terminal device 30. By pressing an "OK" button, the setting value in the chat application notification setting screen related to the forwarding the FAX data is stored in the HDD 104. In step S906, the image forming apparatus 10 stores these button display settings in the HDD 104 in addition to the above created scheduled forwarding time notification information based on the settings of 711 to 713.

Then, in step S907, the image forming apparatus 10 transmits the scheduled forwarding time notification information stored in the HDD 104 in step S906 to the chat server 20.

In step S908, the chat server 20 stores the scheduled forwarding time notification information received from the image forming apparatus 10 in the scheduled forwarding time notification information 214 in the storage unit 210. The chat processing unit 201 of the control unit 200 analyzes the scheduled forwarding time notification information stored in the scheduled forwarding time notification information 214 and creates a chat message about the scheduled forwarding time information from the dialogue data 211. Further, the chat processing unit 201 creates buttons (buttons 804 to 806 in FIG. 8B) for asking the user to instruct to cancel the forwarding, change the scheduled forwarding time, and change the forwarding destination according to the button display setting added to the scheduled forwarding time information. A message for displaying buttons for asking the user to instruct to cancel the forwarding, change the scheduled forwarding time, and change the forwarding destination may be generated by the image forming apparatus 10 and transmitted to the chat server 20 at the timing of, for example, step S907. In step S909, the chat server 20 transmits the chat message about the scheduled forwarding time information created in step S908 and buttons to cancel the forwarding, change the scheduled forwarding time, and change the forwarding destination to the terminal device 30.

In step S910, the terminal device 30 receives the message about the transfer scheduled time information and buttons to cancel the forwarding, change the scheduled forwarding time, and change the forwarding destination from the chat server 20 in the chat processing unit 301 of the control unit 300. The control program 311 of the storage unit 310 also starts the chat application and displays the chat message received from the chat server 20 (for example, a message like message 802 or 803 in FIG. 8B) on the display unit 320.

Figure 8B:
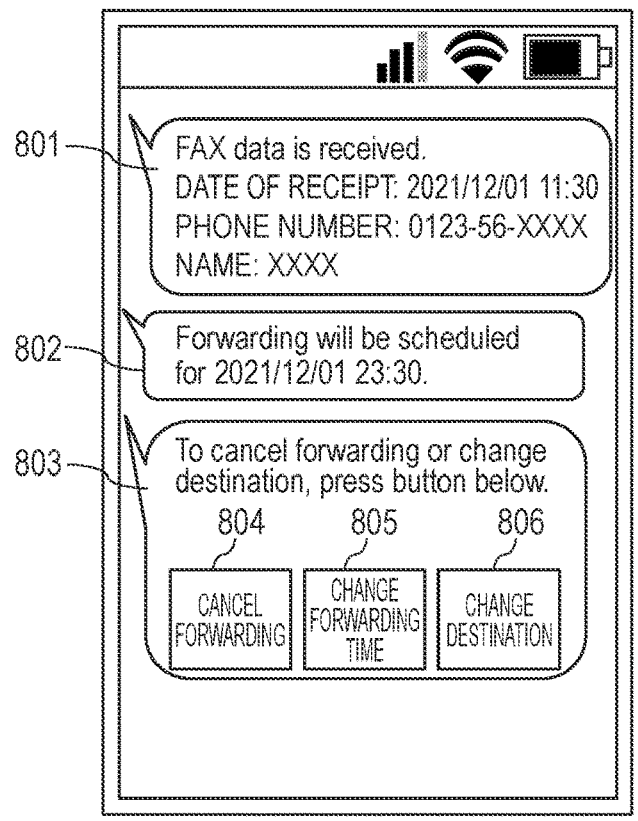
FIG. 8B illustrates an example showing the screen of the chat application displayed on the display unit of the terminal device.

A message 802 in FIG. 8B shows the chat message with the scheduled forwarding time information received from the chat server 20 displayed on the chat application of the terminal device 30. A message 803 shows the chat message received from the chat server 20, the button 804 to cancel the forwarding, the button 805 to change the scheduled forwarding time, and the button 806 to change the forwarding destination displayed on the chat application of the terminal device 30. FIG. 8B shows an example if all the button display settings in FIG. 7B are set to "display". In addition to the chat message, image information of the forwarded FAX data (i.e., a message indicating the content of the received data to be forwarded) may be displayed so that the user can easily understand what data and document is to be operated.

In step S911, if the terminal device 30 detects that the button to cancel the forwarding, change the scheduled forwarding time, or change the forwarding destination is pressed by the user, the terminal device 30 creates a chat message corresponding to the pressed button, displays the created chat message on the display unit 320, and transmits the created chat message to the chat server 20.

Figure 8C:
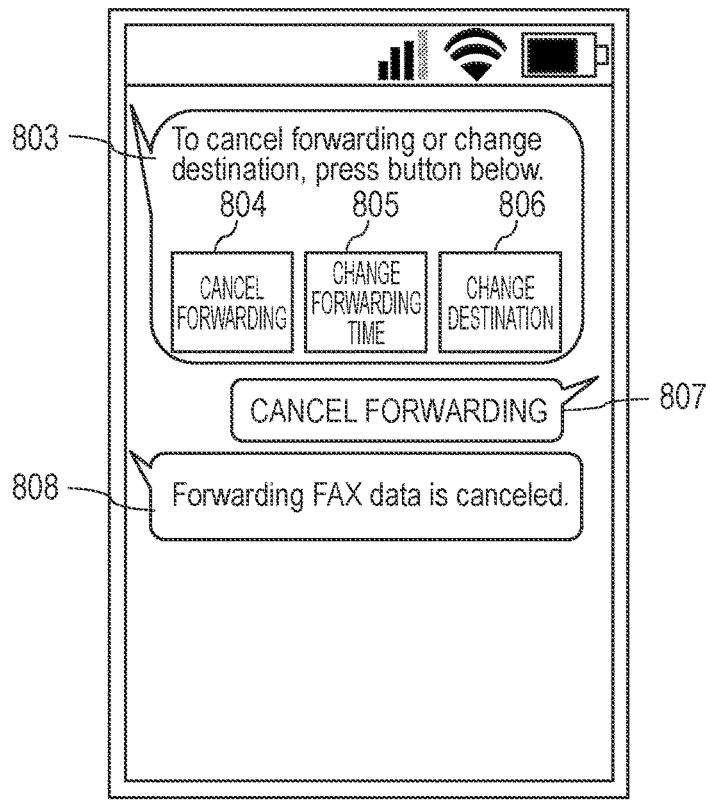
FIG. 8C illustrates an example showing a screen of the chat application displayed on the display unit of the terminal device.
Figure 8D:
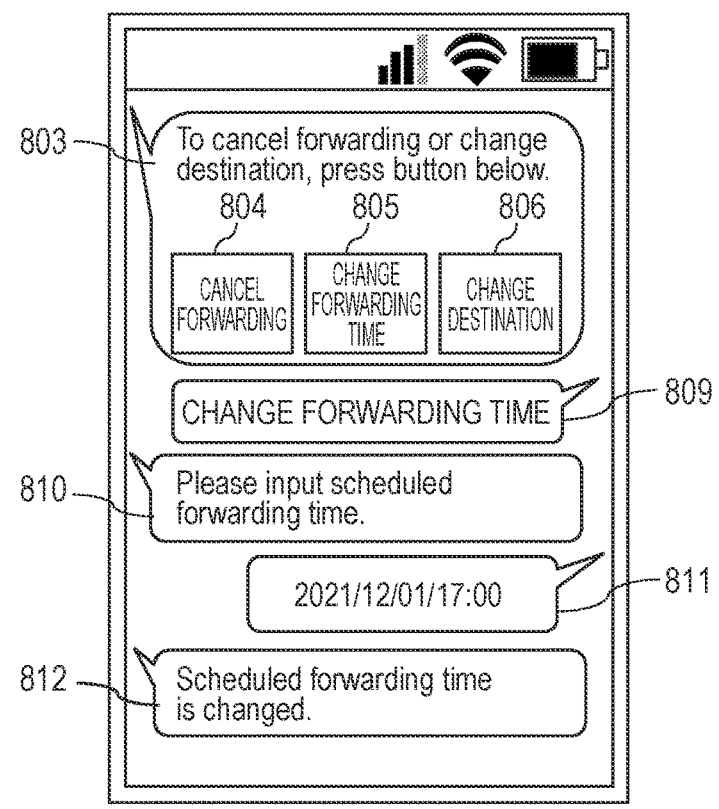
FIG. 8D illustrates an example showing a screen of the chat application displayed on the display unit of the terminal device.
Figure 8E:
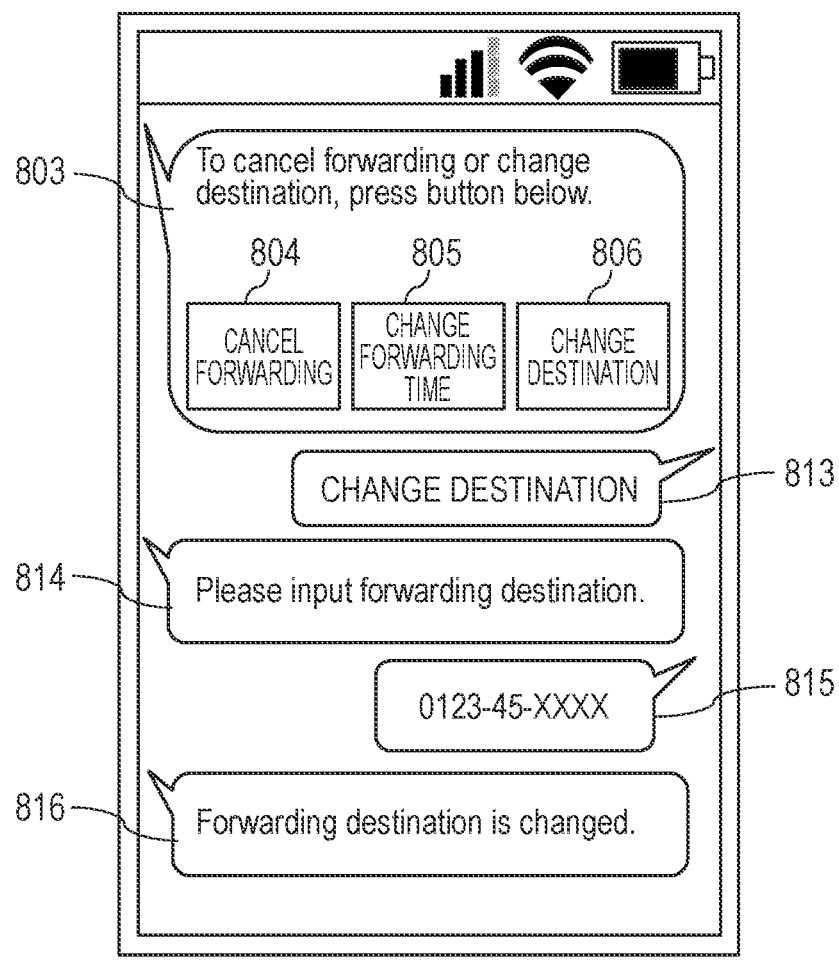
FIG. 8E illustrates an example showing a screen of the chat application displayed on the display unit of the terminal device.

In step S912, the chat server 20 functions as a chatbot, and the chat processing unit 201 talks with the terminal device 30 based on the dialogue data 211 in the storage unit 210, and exchanges messages as shown in FIGS. 8C to 8E. For example, if the user presses the button 804, the message like the message 807 in FIG. 8C is displayed on the terminal device 30, and an instruction to cancel the forwarding is transmitted to the chat server 20. If the user presses the button 805, the messages 809 and 810 in FIG. 8D are displayed. If the user inputs the scheduled forwarding time of "2021/12/01 17:00", a message 811 indicating the scheduled forwarding time is displayed, and an instruction to change the scheduled forwarding time based on the input scheduled forwarding time is transmitted to the chat server 20. If the user presses the button 806, messages 813 and 814 in FIG. 8E are displayed. If the user inputs the destination "0123-45-xxxx", a message 815 indicating the input destination is displayed, and an instruction to change the forwarding destination based on the input destination is transmitted to the chat server 20.

In step S913, the chat server 20 specifies the instructed processing content from the terminal device 30. For example, the chat server 20 specifies the processing content such as cancel the forwarding, change the scheduled forwarding time, change the forwarding destination, and the like. In step S914, the chat server 20 transmits a processing instruction specified in step S913 to the image forming apparatus 10.

In step S915, the information reception control unit 114 of the image forming apparatus 10 receives the processing instruction from the chat server 20 and executes a corresponding processing. Details of the processing in step S915 will be described later in FIG. 10. In step S916, the image forming apparatus 10 determines whether the processing to cancel the forwarding, change the scheduled forwarding time, or change the forwarding destination in step S915 is completed. Upon completion, the image forming apparatus 10 transmits a processing completion notice to the chat server 20.

In step S917, the chat server 20 generates a processing completion message by the chat processing unit 201 with the canceling or changing completion notice received from the image forming apparatus 10. In step S918, the chat server 20 transmits the processing completion message created in step S917 to the terminal device 30.

In step S919, the terminal device 30 displays the processing completion message on the display unit 320 by the chat application. For example, if the cancel of forwarding is completed, a message 808 is displayed as shown in FIG. 8C. If the change of the scheduled forwarding time is completed, a message 812 is displayed as shown in FIG. 8D. If the change of the forwarding destination is completed, a message 816 is displayed as shown in FIG. 8E.

Figure 10:
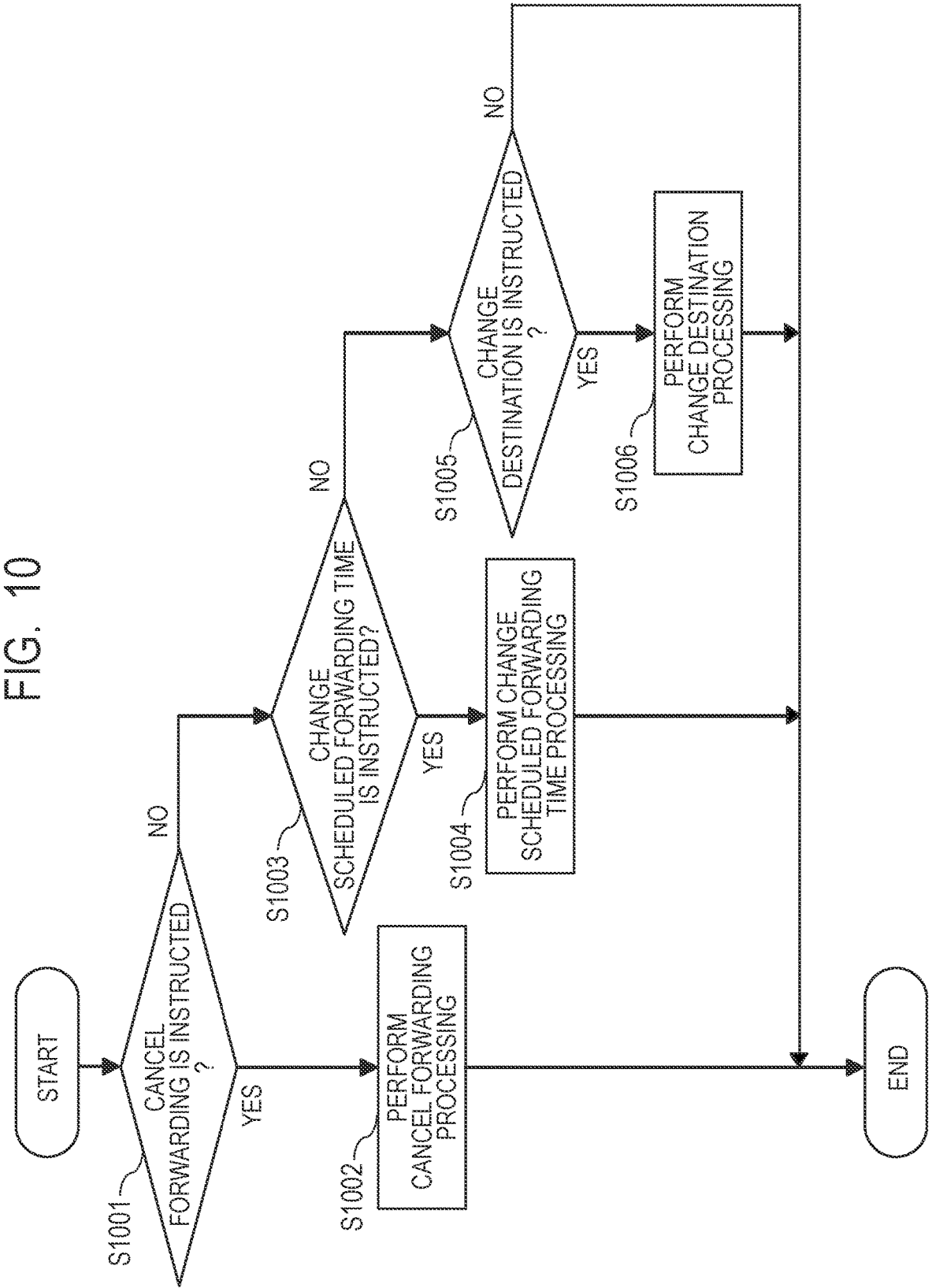
FIG. 10 illustrates a flowchart showing processing executed by the image forming apparatus according to an instruction received from the chat server to cancel forwarding, change forwarding time, and change destination.

The control in which the image forming apparatus 10 receives processing instructions from the chat server 20 and executes the corresponding processing will be described below with reference to FIG. 10. FIG. 10 illustrates a flowchart showing an example of processing executed by the image forming apparatus 10 according to processing instructions of cancel of the forwarding, change of the scheduled forwarding time, and change of the forwarding destination received from the chat server 20. Processing by the CPU 101 in the flowchart is realized by the CPU 101 reading and executing control programs stored in the ROM 102 or the like.

In step S1001, the CPU 101 of the image forming apparatus 10 determines whether or not the content of the processing instruction from the chat server 20 to the information reception control unit 114 is an instruction to cancel the forwarding. If the content of the processing instruction is the cancel (Yes in step S1001), the CPU 101 advances the process to step S1002. In step S1002, the CPU 101 instructs the information reception control unit 114 to delete the scheduled forwarding information created in step S507 of FIG. 5, cancel the forwarding, and terminate the processing of the flowchart.

On the other hand, if the content of the processing instruction from the chat server 20 to the information reception control unit 114 is not an instruction to cancel the forwarding (No in step S1001), the CPU 101 advances the process to step S1003. In step S1003, the CPU 101 determines whether or not the content of the processing instruction from the chat server 20 to the information reception control unit 114 is an instruction to change the scheduled forwarding time. If the content of the processing instruction is the change of the scheduled forwarding time (Yes in step S1003), the CPU 101 advances the process to step S1004. In S 1004, the CPU 101 instructs the information reception control unit 114 to change the scheduled forwarding time of the forwarding reservation information created in step S507 of FIG. 5 based on the scheduled forwarding time received from the chat server 20, and terminates the processing of the flowchart.

On the other hand, if the content of the processing instruction from the chat server 20 to the information reception control unit 114 is not an instruction to change the scheduled forwarding time (No in step S1003), the CPU 101 advances the process to step S1005. In step S1005, the CPU 101 determines whether or not the content of the processing instruction from the chat server to the information reception control unit 114 is an instruction to change the forwarding destination. If the content of the processing instruction is the change of the forwarding destination (Yes in step S1005), the CPU 101 advances the process to step S1005. In step S1006, the CPU 101 instructs the information reception control unit 114 to change the forwarding destination of the scheduled forwarding information created in step S507 of FIG. 5 based on the forwarding destination telephone number received from the chat server 20, and terminates the processing of the flowchart.

On the other hand, if the content of the processing instruction from the chat server 20 to the information reception control unit 114 is not an instruction to change the forwarding destination (No in step S1005), the CPU 101 performs processing according to the received instruction content in a step (not shown), and terminates the processing of the flowchart.

As described above, in the first embodiment, if the image forming apparatus 10 receives the FAX data, the image forming apparatus notifies the chat application of the terminal device 30 of the scheduled forwarding time, and provides the means for the user to issue an instruction from the chat application to cancel the forwarding, change the scheduled forwarding time, or change the forwarding destination. The user can confirm the scheduled forwarding time, cancel the forward the FAX data, change the scheduled forwarding time, change the forwarding destination, and the like by the chat application without opening the corresponding setting screen by the operation unit 109 of the image forming apparatus 10. As a result, the usability related to the FAX data forwarding function in the image processing apparatus cooperated with the chat application can be greatly improved.

It is also possible to configure the image forming apparatus 10 to execute specific processing, such as discarding, printing, or storing the forwarding FAX data when the user instructs to cancel the forwarding. In this case, the image forming apparatus 10 may notify the chat server 20 of the completion of processing (discarding, printing, or storing) for the forwarding FAX data and display the completion of processing in the chat application. For example, a message such as "the FAX data has been discarded", "the FAX data has been printed", or "the FAX data has been stored" may be displayed in the chat application.

Second Embodiment

In the second embodiment, a configuration that the image forming apparatus 10 can set the processing for the forwarding FAX data when the user instructs to cancel the forwarding will be described.

Figure 12:
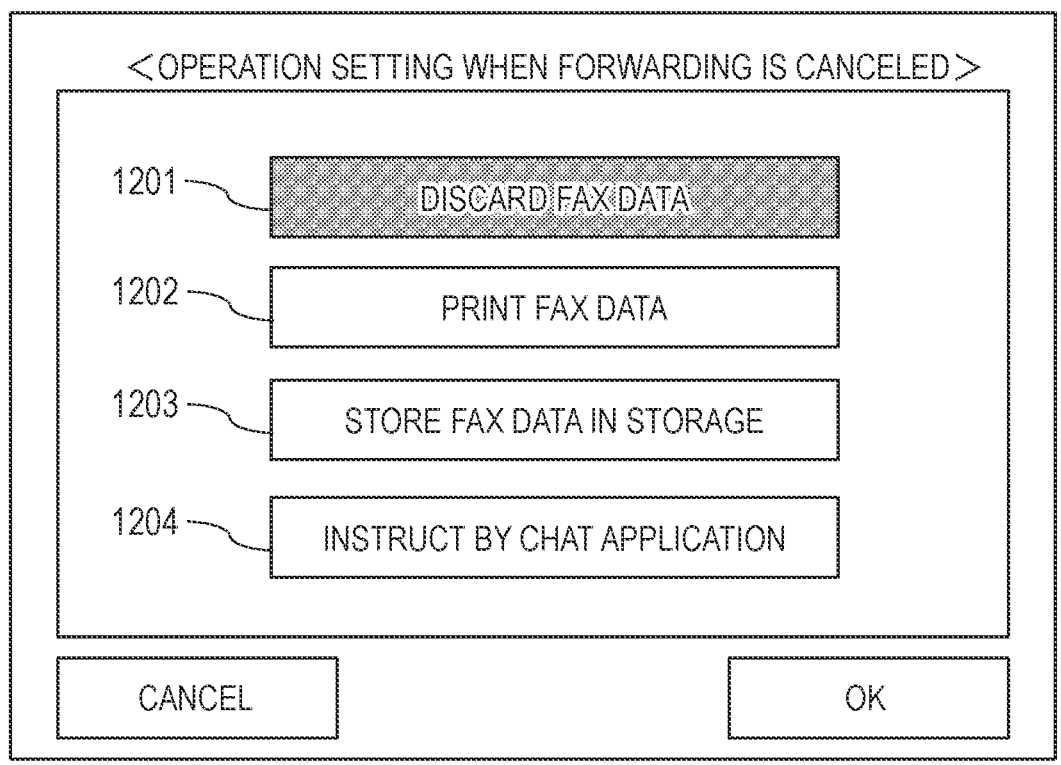
FIG. 12 illustrates a diagram showing an action setting screen to select a processing to be executed in response to canceling to forward the data instructed in the image forming apparatus.

FIG. 12 illustrates a diagram showing an example of the operation setting screen at cancel the forwarding for setting what kind of processing the image forming apparatus 10 selects when the user instructs to cancel the forwarding. The operation setting screen at cancel the forwarding is displayed by performing a predetermined operation via the operation unit 109 of the image forming apparatus 10.

A button 1201 is a button to discard the received FAX data stored in the HDD 104 when the user instructs to cancel the forwarding. A button 1202 is a button to print the received FAX data on the printer 110 when the user instructs to cancel the forwarding. A button 1203 is a button to store the received FAX data in the HDD 104 as a storage document when the user instructs to cancel the forwarding. A button 1204 is a button to transmit a message to the chat application of the terminal device 30 when the user instructs to cancel the forwarding, the message prompting a response on the action at canceling the forwarding. It should be noted that the user can select only one of the buttons 1201 to 1204. If the user selects one of the buttons, the selection status of the other buttons is released. If the user presses an "OK" button, the setting value in the operation setting screen at cancel the forwarding is stored in the HDD 104.

Figure 13:
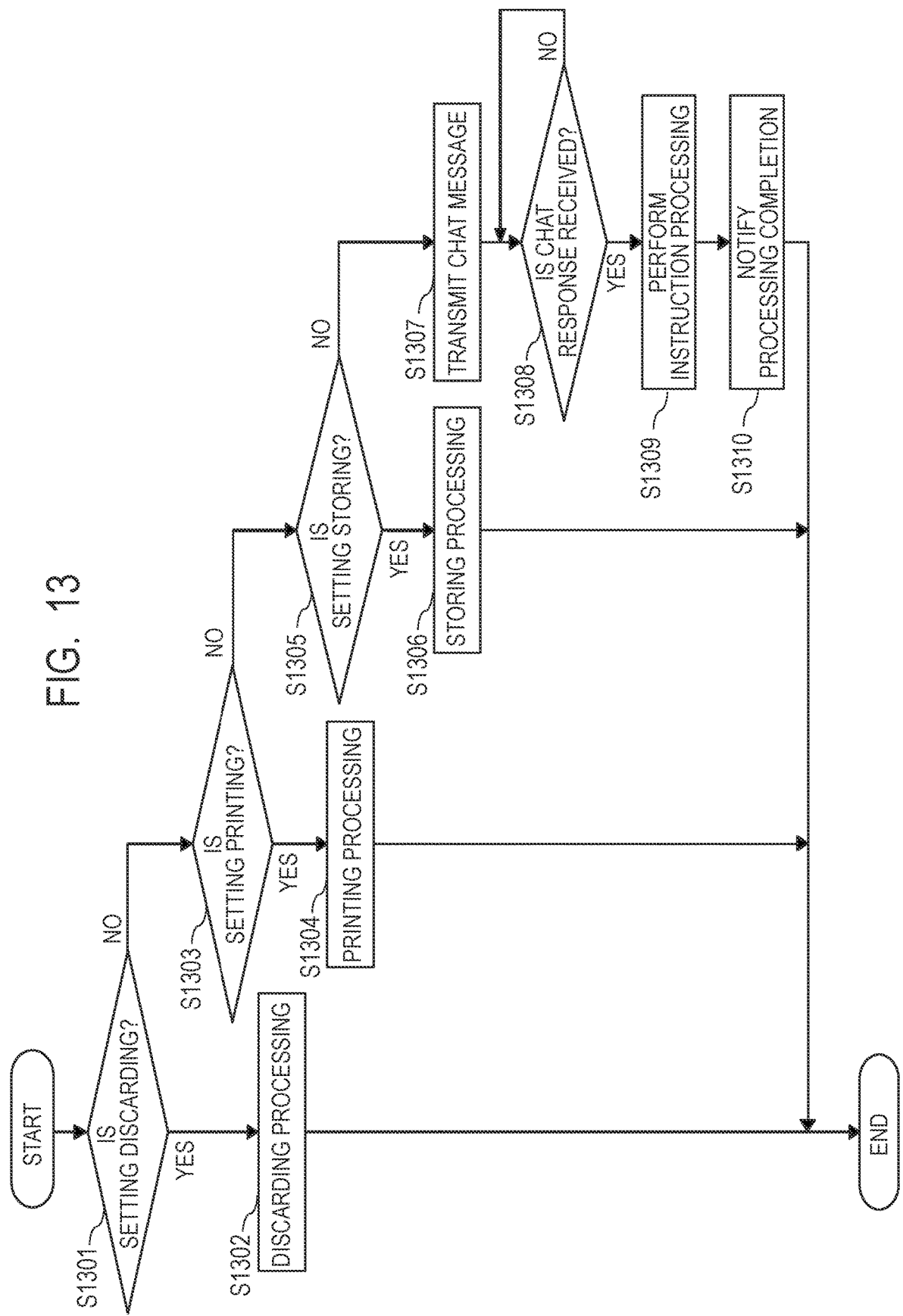
FIG. 13 illustrates a flowchart showing the processing based on the action setting in response to canceling to forward the data by the image forming apparatus.

FIG. 13 illustrates a flowchart showing an example of processing performed according to the setting of FIG. 12 when the image forming apparatus 10 cancels to forward the FAX data. For example, the CPU 101 starts the processing of the flowchart following the forward cancellation processing in step S1002 of FIG. 10. FIGS. 14A to 14D illustrate an example showing the chat application screen displayed on the display unit 320 of the terminal device 30. Hereafter, FIGS. 14A to 14D are collectively referred to as "FIG. 14".

In step S1301, the CPU 101 determines whether or not the setting is to discard the received FAX data if the forwarding is canceled. If the setting is to discard the received FAX data (Yes in step S1301), the CPU 101 advances the process to step S1302. In step S1302, the CPU 101 instructs the FAX control unit 112 to discard the received FAX data stored in the HDD 104, and terminates the processing of the flowchart.

On the other hand, if the setting is not to discard the received FAX data if the forwarding is canceled (No in step S1301), the CPU 101 advances the process to step S1303. In step S1303, the CPU 101 determines whether or not the setting is to print the received FAX data at the printer 110 (printing) if the forwarding is canceled. If the setting is to print the received FAX data (Yes in step S1303), the CPU 101 advances the process to step S1304. In step S1304, the CPU 101 instructs the printer control unit 106 to print the received FAX data stored in the HDD 104 by the printer 110, and terminates the processing of the flowchart.

On the other hand, if the setting is not to print the received FAX data by the printer 110 if the forwarding is canceled (No in step S1303), the CPU 101 advances the process to S1305. In step S1305, the CPU 101 determines whether or not the setting is to store the received FAX data as a stored document if the forwarding is canceled (storing). If the setting is to store the received FAX data as a stored document (Yes in step S1305), the CPU 101 advances the process to step S1306. In step S1306, the CPU 101 performs processing (storing) to store the received FAX data in the HDD 104 so that the user can view the received FAX data as a stored document, and terminates the processing of the flowchart.

On the other hand, if the setting is not to store the received FAX data as a stored document if the forwarding is canceled (No in step S1305), the CPU 101 advances the process to step S1307. In step S1307, the CPU 101 determines that, by selecting the button 1204 in FIG. 12, the setting is set to transmit the message to the chat application prompting the answer to the action when the forwarding is canceled. The CPU 101 instructs the information notification control unit 113 to transmit the message prompting the answer to the action when the forwarding is canceled to the chat application of the terminal device 30 via the chat server 20. As a result, the message prompting the answer to the action when the forwarding is canceled is notified to the terminal device 30 via the chat server 20 and displayed on the chat application screen as in message 1401 in FIG. 14A.

Figure 14A:
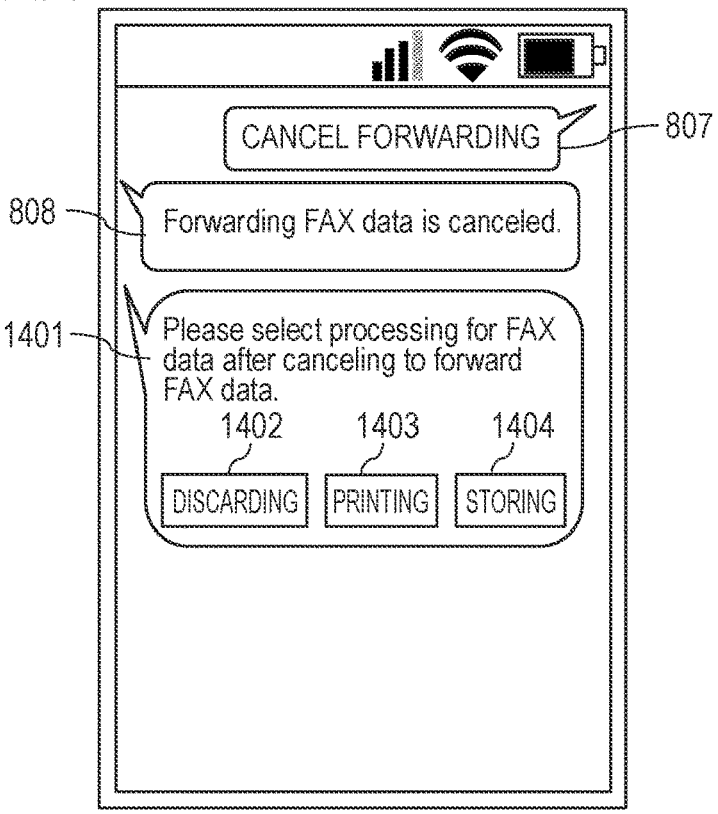
FIG. 14A illustrates a chat application screen displayed on the display unit of the terminal device.

A message 1401 in FIG. 14A shows an example of a screen in which a message prompting an answer to the action when canceling the forwarding in step S1307 in FIG. 13 is displayed on the chat application of the terminal device 30. A discard button 1402, a print button 1403, and a store button 1404 are buttons for asking the user to specify instructions for processing the forwarding FAX data. The discard button 1402 is a button for discarding the forwarding FAX data stored in the HDD 104 when the forwarding is canceled. The print button 1403 is a button for printing the forwarding FAX data in the printer 110 when the forwarding is canceled. The store button 1404 is a button for managing the forwarding FAX data stored in the HDD 104 as a storage document when the forwarding is canceled. Such a message can prompt the user to answer the action at the time when canceling the forwarding. After the processing in step S1307, the CPU 101 advances the process to step S1308.

In step S1308, the CPU 101 determines whether or not a processing instruction has been received from the chat server 20 by the information reception control unit 114. If the processing instruction has not been received (No in step S1308), the CPU 101 repeats the processing in step S1308. On the other hand, if the processing instruction has been received (Yes in step S1308), the CPU 101 advances the process to step S1309.

In step S1309, the CPU 101 executes the processing according to the instruction received from the chat server 20 in the information reception control unit 114. Then, in step S1310, the CPU 101 transmits a processing completion notice notifying that the processing in step S1309 is completed to the chat server 20.

Figure 14B:
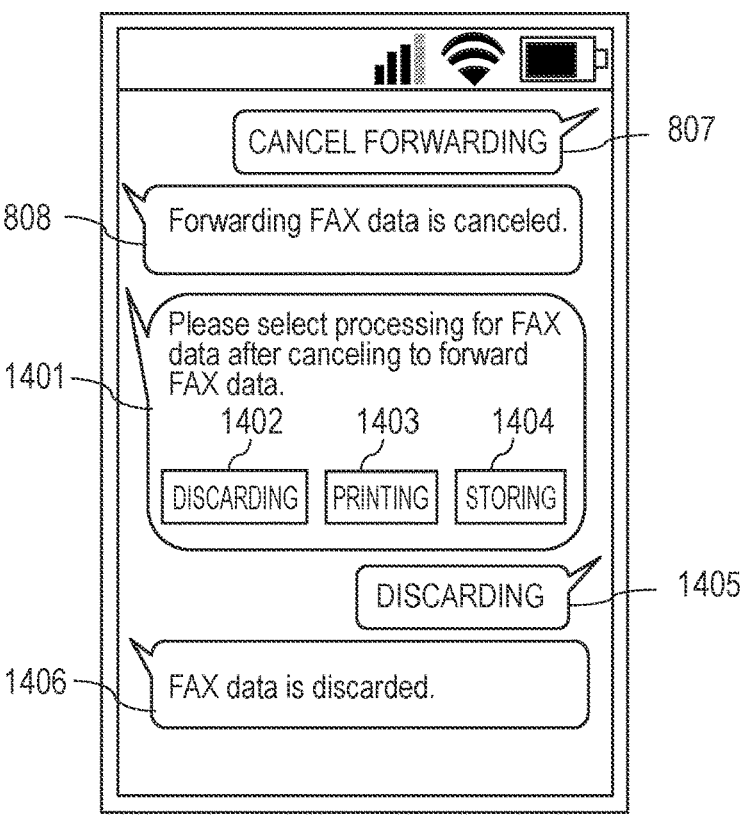
FIG. 14B illustrates the chat application screen displayed on the display unit of the terminal device.

Here, the screens displayed in the chat application of the display unit 320 in response to the pressing of the discard button 1402, the print button 1403, and the store button 1404 are respectively described. FIG. 14B illustrates an example showing the display of the chat application of the display unit 320 in response to the pressing of the discard button 1402. If the user presses the discard button 1402, a message such as message 1405 is displayed on the terminal device 30, and an instruction to discard the forwarding FAX data is transmitted to the chat server 20. The chat server 20 instructs the image forming apparatus 10 to discard the forwarding FAX data based on the message 1405, and the image forming apparatus 10 performs processing to discard the forwarding FAX data similar to that in step S1302 described above in step S1309. If the discarding process is completed, the image forming apparatus 10 notifies completion of execution in step S1310, and the message 1406 is displayed in the chat application.

Figure 14C:
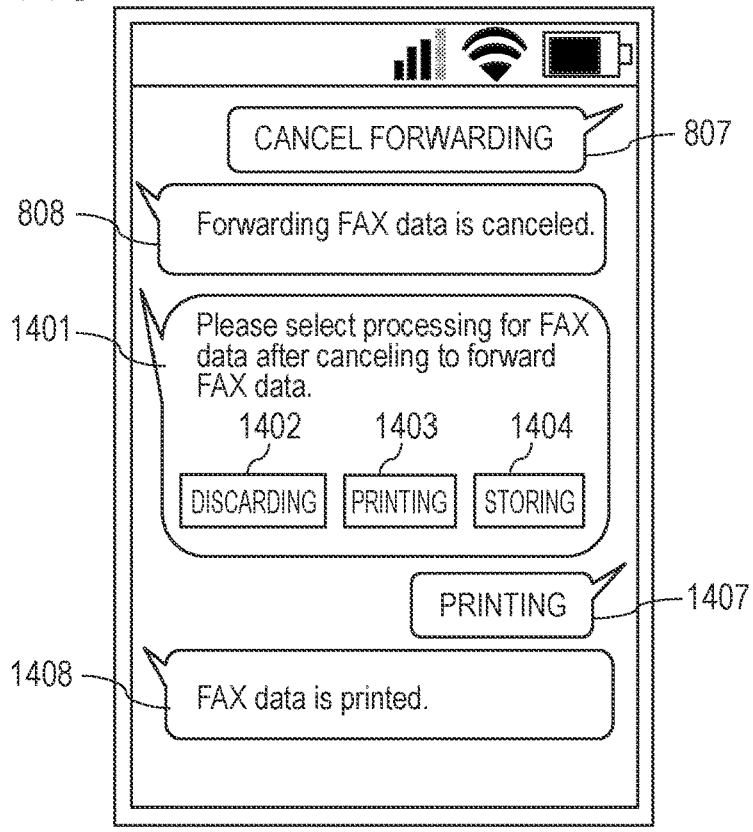
FIG. 14C illustrates the chat application screen displayed on the display unit of the terminal device.

FIG. 14C illustrates an example showing the display of the chat application in the display unit 320 when the print button 1403 is pressed. If the user presses the print button 1403, a message such as message 1407 is displayed on the terminal device 30, and an instruction for printing the forwarding FAX data is transmitted to the chat server 20. The chat server 20 instructs the image forming apparatus 10 to print the forwarding FAX data based on the message 1407, and the image forming apparatus 10 performs the processing for printing the forwarding FAX data similar to that in step S1304 described above in step S1309. If the printing process is completed, the image forming apparatus 10 notifies completion of execution in step S1310, and the message 1408 is displayed in the chat application.

Figure 14D:
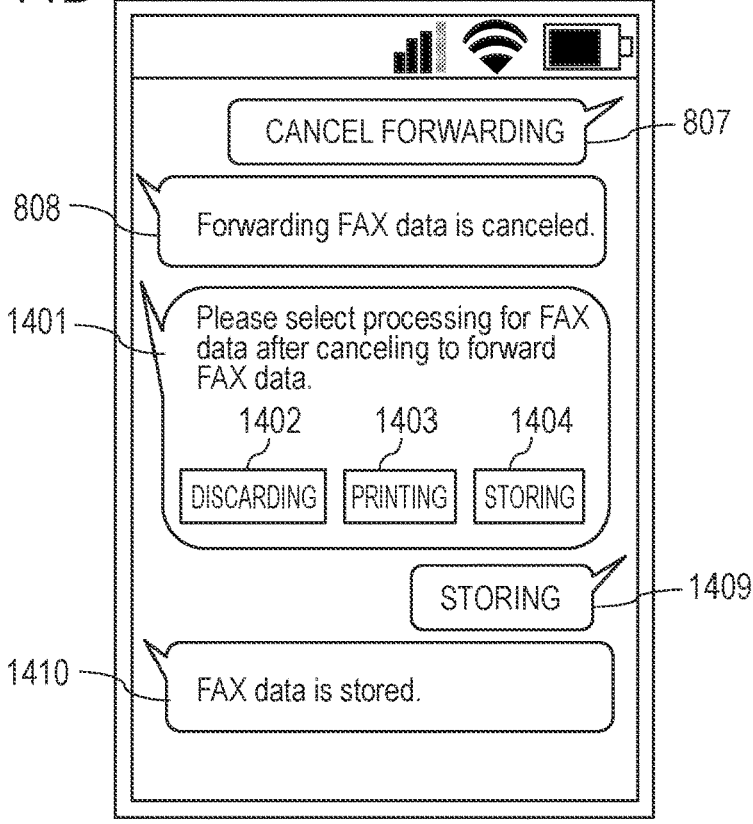
FIG. 14D illustrates the chat application screen displayed on the display unit of the terminal device.

FIG. 14D illustrates an example showing the display of the chat application in the display unit 320 when the store button 1404 is pressed. If the user presses the store button 1404, a message such as message 1409 is displayed on the terminal device 30, and an instruction for storing the forwarding FAX data is transmitted to the chat server 20. The chat server 20 instructs the image forming apparatus 10 to store the forwarding FAX data based on the message 1409, and the image forming apparatus 10 performs the processing for storing the forwarding FAX data similar to that in step S1306 described above in step S1309. If the storing processing is completed, the image forming apparatus 10 notifies completion of execution in step S1310, and the message 1410 is displayed in the chat application.

As described above, in the second embodiment, if the image forming apparatus 10 is instructed to cancel the forwarding, a means is provided for instructing the forwarding FAX data to be discarded, printed, and stored. With this, it is possible to properly process the forwarding FAX data canceled from the chat application without opening the corresponding setting screen in the operation unit 109 of the image forming apparatus 10. Note that the processing of the received FAX data after canceling the forwarding at the scheduled forwarding time is not limited to the processing to discard the received FAX data, the processing to print the received FAX data, and the processing to store the received FAX data, but other processing may be performed on the received FAX data for which the forwarding is canceled.

As described above, according to each embodiment, it is possible to confirm the scheduled forwarding time, cancel the forwarding, change the scheduled forwarding time, change the forwarding destination, and the like, without opening the corresponding setting screen in the operation unit in the image forming apparatus that uses a chat application to issue FAX reception notifications and processing instructions. Therefore, the usability related to the FAX forward function of the image processing apparatus cooperated with the chat application can be greatly improved.

It is needless to say that the structure and contents of the various types of data described above are not limited to this, but may consist of various structures and contents according to the use and purpose. Although one embodiment has been described above, embodiments of the present disclosure can be implemented as a system, apparatus, method, program or storage medium, for example. Specifically, it can be applied to a system consisting of multiple devices, or it can be applied to an apparatus consisting of one device. In addition, all of the configurations combining the above respective embodiment are also included in the present disclosure.

According to the present disclosure, confirmation of the scheduled forwarding time of the received FAX data by the image processing apparatus can be performed from the network communication service, and usability related to the forwarding FAX data function can be greatly improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-053570, filed Mar. 29, 2022, which is hereby incorporated by reference herein in its entirety.

What is claimed is:

1. An image processing apparatus receiving data from a facsimile comprising:
   one or more memories; and
   one or more processors that execute instructions to:
      manage a destination and a scheduled time setting to forward the data received from the facsimile; and
      post a message indicating that the data is received to a message communication service in response to receiving the data from the facsimile,
      wherein, based on a reception of a cancel instruction to cancel to forward the data at a scheduled time via the message communication service, the forwarding of the data is cancelled.

2. The image processing apparatus according to claim 1, wherein the message further indicates contents of the data.

3. The image processing apparatus according to claim 1, wherein, in a case where the forwarding of the data at the scheduled time is cancelled, the data is discarded, printed, or stored.

4. The image processing apparatus according to claim 3, wherein a completion notification of processing the data after canceling to forward the data is posted to the message communication service.

5. The image processing apparatus according to claim 1, wherein the one or more processors further execute instructions to:
   preset a second setting to process the data after canceling to forward the data at the scheduled time,
   wherein the data is processed based on the second setting after canceling to forward the data.

6. The image processing apparatus according to claim 5, wherein the processing after canceling to forward the data at the scheduled time includes discarding, printing, or storing the data.

7. The image processing apparatus according to claim 1, wherein, in a case where the forwarding of the data is cancelled, a message requesting input for an instruction to process the data after canceling to forward the data is posted to the message communication service, wherein the data is processed based on the instruction received via the message communication service.

8. The image processing apparatus according to claim 7, wherein the message requesting input for the instruction to discard, print, or store the data is posted as the instruction to process the data after canceling to forward the data at the scheduled time.

9. The image processing apparatus according to claim 1, wherein, in a case where a change instruction to change the scheduled time to forward the data is received via the message communication service, the data is forwarded to the destination at the changed scheduled time.

10. The image processing apparatus according to claim 1, wherein, in a case where a change instruction to change the destination to forward the data is received via the message communication service, the data is forwarded to the changed destination at the scheduled time.

11. The image processing apparatus according to claim 1, wherein the one or more processors further execute instructions to:

set a first setting to enable receiving a forward instruction to forward the data via the message communication service, wherein, in a case where the first setting is set, a message requesting input for the forward instruction to forward the data is posted to the message communication service, and the forward instruction to forward the data is received via the message communication service.

12. The image processing apparatus according to claim 1, wherein the message is posted based on the managed scheduled time setting and the message indicates the scheduled time when the data is forwarded.

13. A method of controlling an image processing apparatus receiving data from a facsimile, the method comprising:

posting a message indicating that the data is received to a message communication service in response to receiving the data from the facsimile, wherein, based on a reception of a cancel instruction to cancel to forward the data at a scheduled time via the message communication service, the forwarding of the data is cancelled.

14. A non-transitory computer-readable storage medium storing program to cause a computer to perform a method of controlling an image processing apparatus receiving data from a facsimile, the method comprising:

posting a message indicating that the data is received to a message communication service in response to receiving the data from the facsimile, wherein, based on a reception of a cancel instruction to cancel to forward the data at a scheduled time via the message communication service, the forwarding of the data is cancelled.

* * * * *